US012770085B2

(12) United States Patent
Thakur et al.

(10) Patent No.: US 12,770,085 B2
(45) Date of Patent: Oct. 20, 2026

(54) METHODS AND SYSTEMS FOR IDENTIFYING AND ADDRESSING WORKER FATIGUE

(71) Applicant: UKG Inc., Weston, FL (US)

(72) Inventors: Viraj Thakur, Westford, MA (US); Brett Myers, Noblesville, IN (US); Alexander Khvesko, Warsaw (PL); Pavel Yakubenka, Vilnius (LT)

(73) Assignee: UKG Inc., Weston, FL (US)

( * ) Notice: Subject to any disclaimer, the term of this patent is extended or adjusted under 35 U.S.C. 154(b) by 97 days.

(21) Appl. No.: 18/056,127

(22) Filed: Nov. 16, 2022

(65) Prior Publication Data

US 2024/0161046 A1 May 16, 2024

(51) Int. Cl.
*G06Q 10/0639* (2023.01)

(52) U.S. Cl.
CPC .............................. *G06Q 10/06398* (2013.01)

(58) Field of Classification Search
None
See application file for complete search history.

(56) References Cited

U.S. PATENT DOCUMENTS

| | | | | |
|---|---|---|---|---|
| 11,241,194 B2 * | 2/2022 | Reifman | A61B 5/00 | |
| 2005/0154634 A1 * | 7/2005 | Konop | G06Q 50/40 | 705/7.27 |
| 2006/0200008 A1 * | 9/2006 | Moore-Ede | A61B 5/18 | 128/920 |
| 2011/0028857 A1 * | 2/2011 | Rodriguez Ibanez | A61B 5/16 | 600/529 |
| 2012/0089553 A1 * | 4/2012 | Mollicone | G06N 5/048 | 706/52 |
| 2012/0203464 A1 * | 8/2012 | Mollicone | G06Q 10/0639 | 702/19 |
| 2013/0006064 A1 * | 1/2013 | Reiner | A61B 5/0022 | 600/300 |
| 2015/0206090 A1 * | 7/2015 | Pakhchanyan | G06F 3/04895 | 705/7.42 |
| 2016/0345865 A1 * | 12/2016 | Agrawal | G16H 20/30 | |

(Continued)

FOREIGN PATENT DOCUMENTS

EP 2605228 B1 * 2/2017 ............. A61B 5/384

OTHER PUBLICATIONS

M. KoÅodziej et al., "Fatigue Detection Caused by Office Work With the Use of EOG Signal," in IEEE Sensors Journal, vol. 20, No. 24, pp. 15213-15223 (Year: 2020).*

*Primary Examiner* — Jerry O'Connor
*Assistant Examiner* — Philip N Warner
(74) *Attorney, Agent, or Firm* — Lowenstein Sandler LLP

(57) ABSTRACT

Methods and systems for identifying and addressing worker fatigue are provided. Work data associated with a worker of an organization is identified. The work data indicates at least a number of hours worked by the worker during one or more intervals of a time period. A fatigue state associated with the worker during the time period is calculated based on the identified work data. The fatigue state corresponds to an amount of fatigue accumulated by the worker during the time period. A fatigue score associated with the worker is determined based on the calculated fatigue state. The fatigue score indicates a level of fatigue associated with the worker in view of fatigue of other workers of the organization. The fatigue score is provided to a client device.

20 Claims, 8 Drawing Sheets

(56) References Cited

U.S. PATENT DOCUMENTS

| | | | | |
|---|---|---|---|---|
| 2018/0033279 | A1* | 2/2018 | Chong | G06Q 10/0633 |
| 2018/0060987 | A1* | 3/2018 | Cardonha | G06Q 50/265 |
| 2019/0228328 | A1* | 7/2019 | Ohazulike | G06N 5/048 |
| 2019/0343429 | A1* | 11/2019 | Elhawary | A61B 5/6823 |
| 2020/0061478 | A1* | 2/2020 | Kopf | G07F 17/326 |
| 2020/0070838 | A1* | 3/2020 | Smith | G08B 25/08 |
| 2020/0202472 | A1* | 6/2020 | Barak | H04W 4/021 |
| 2023/0113007 | A1* | 4/2023 | Hudak | A63B 24/0062 482/8 |
| 2024/0268769 | A1* | 8/2024 | Lu | A61B 5/7267 |

* cited by examiner

500

| Time Interval 502 | Rest Time? 504 | Total Time Worked 506 | Day Time Worked 508 | Night Time Worked 510 | Day Fatigue 512 | Fatigue Trend 514 | Fatigue Score 516 | Recommended Rest Days 518 |
|---|---|---|---|---|---|---|---|---|
| March 7, 2021 | YES | 0 | 0 | 0 | -10 | 21.31 | 0.98 | 1 |
| March 8, 2021 | NO | 7.9 | 7.9 | 0 | 4.15 | 22.51 | 1.04 | 2 |
| March 9, 2021 | NO | 10.02 | 8.02 | 2.0 | 12 | 30.84 | 4.05 | 3 |
| March 10, 2021 | NO | 9.34 | 6.0 | 3.34 | 11.4 | 32.73 | 5.7 | 3 |
| March 11, 2021 | NO | 8.17 | 8.17 | 0 | 4.19 | 34.5 | 5.9 | 3 |
| March 12, 2021 | NO | 12.5 | 8.05 | 4.45 | 16.78 | 42.63 | 7.1 | 4 |
| March 13, 2021 | YES | 0 | 0 | 0 | -10 | 39.53 | 6.93 | 4 |
| March 14, 2021 | YES | 0 | 0 | 0 | -10 | 38.15 | 6.86 | 4 |
| March 15, 2021 | NO | 8.17 | 0 | 0 | 4.25 | 40.67 | 7.45 | 4 |

FIG. 5

METHODS AND SYSTEMS FOR IDENTIFYING AND ADDRESSING WORKER FATIGUE

TECHNICAL FIELD

Embodiments of the present disclosure relate to computing systems, and more specifically, relate to methods and systems for identifying and addressing worker fatigue.

BACKGROUND

Fatigue refers to a feeling of weariness, tiredness, or lack of energy. In a workplace setting, workers (e.g., employees, independent contractors, etc.) can experience fatigue due to long work hours, irregular work shifts, work that causes sleep loss or disrupted sleep, travel, strenuous physical and/or mental activity, and so forth. In some instances, worker fatigue can negatively impact productivity, quality of work, interactions of employees with customers, interactions between employees, etc. In more severe instances, prolonged worker fatigue can create an unsafe work environment for workers, decrease worker engagement and organizational culture, and can also increase the rate of attrition (e.g., the rate of worker resignation) of an organization and/or decrease business revenue. In some instances, the impact of worker fatigue can be reduced if the worker takes rest time (e.g., vacation time, etc.) away from work and/or switches to a work schedule that reduces the number of hours worked and/or is more convenient for the worker. It can be difficult for managers to identify workers that are experiencing and/or susceptible to worker fatigue. Even if a manager can identify workers experiencing and/or susceptible to worker fatigue, it can be difficult for the manager to determine which measures may be helpful to reduce the impact of the worker fatigue.

BRIEF DESCRIPTION OF THE DRAWINGS

The disclosure is illustrated by way of example, and not by way of limitation, and can be more fully understood with references to the following detailed description when considered in connection with the figures, in which:

FIG. 5 depicts example fatigue data determined for a worker of an organization, in accordance with embodiments of the present disclosure.

DETAILED DESCRIPTION

Figure 1:
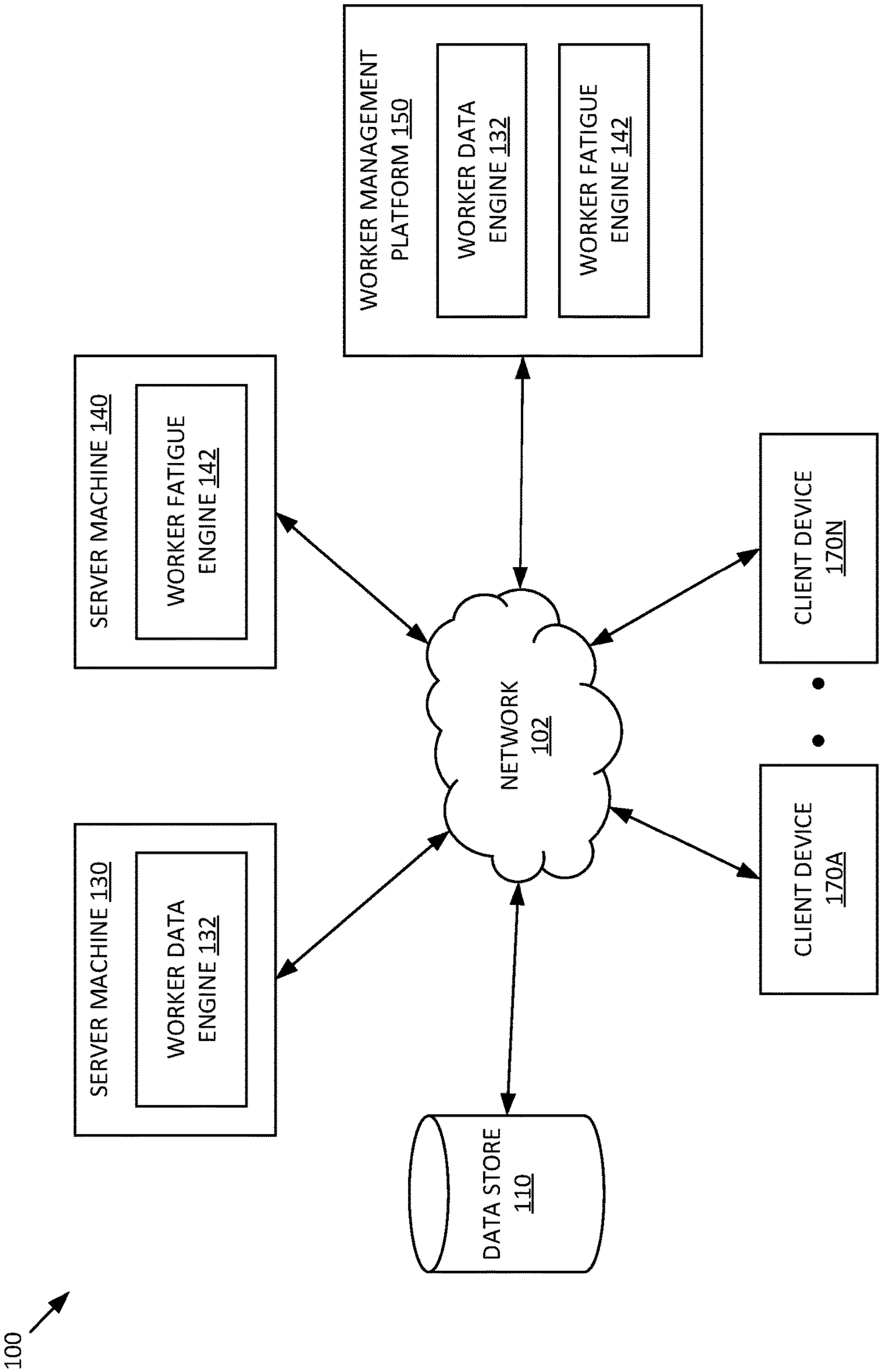
FIG. 1 illustrates a high-level component diagram of an example architecture, in accordance with one or more embodiments of the present disclosure.

Described herein are methods and systems for identifying and addressing worker fatigue. Fatigue refers to a feeling of weariness, tiredness, or lack of energy. Workers (e.g., employees, independent contractors, etc.) of an organization can experience workplace fatigue (also referred to as worker fatigue or employee fatigue), which can occur for a variety of reasons, including long work hours, working too many consecutive days, poor work conditions, working rotating shifts (e.g., scheduled shifts that change over time) and/or irregular shifts, etc. Worker fatigue can increase a worker's stress levels, which can negatively impact the worker's productivity, quality of work, interactions with customers, interactions with other workers of the organization, and so forth. In some instances, worker fatigue across a workplace can decrease worker engagement and organizational culture, increase the rate of attrition of the organization, and/or decrease business revenue. In more severe instances, worker fatigue can affect a worker's alertness, concentration, judgment, motor skills, reflexes, etc., which can lead to an increased risk of workplace accidents and near-miss incidents and endanger the worker and other workers in the organization.

Worker fatigue may not only be caused by a single day of work and instead may be caused by events of multiple days of work across a time period. For example, a worker that normally works day shifts may work multiple night shifts over a period of several days. Although the level of work performed by the worker can be the same during each night shift, the worker can experience a higher level of fatigue after the final night shift than was experienced after the initial night shift due to the accumulation of fatigue over the period of several days. Accordingly, the organization may not be able to identify appropriate measures that will reduce the worker fatigue based on the worker's responses, and the level of worker fatigue for the worker and/or for other workers in the organization may not decrease and in some instances may increase. Such levels of worker fatigue can continue or further impact the workers and/or the organization, as described above.

Implementations of this disclosure address the above-mentioned and other deficiencies by providing techniques for identifying and addressing worker fatigue. In some embodiments, a platform (e.g., a worker management platform) can collect data associated with one or more workers (e.g., employees, independent contractors, etc.) of an organization. For example, a manager of an organization can provide the worker management platform with a work schedule associated with an employee of the organization (e.g., via a client device connected to the platform). A work schedule can indicate a set of work shifts during a time period (e.g., a week, a month, etc.) that the employee is expected to work for the organization. In some instances, the work schedule can indicate one or more time intervals (e.g., days) of the time period that the employee is not to expected to work. Such time intervals can include rest days, vacation days, etc. The employee and/or the manager can provide information indicating a number of hours that the employee has worked (e.g., for a particular day, for a particular week, etc.) to the platform and the platform can track a number of hours worked over a time period (e.g., a week, a month, etc.) in accordance with the work schedule based on the provided information. Such data collected by the platform is referred to herein as work data. Work data can include a work schedule associated with a worker, a number of hours worked by the worker according to the work schedule and/or outside of the work schedule, and so forth. For purposes of example and illustration only, a worker can submit a number of hours worked (e.g., for a particular day, for a particular week, etc.) via a time card that is provided using a client device associated with the worker or via another device associated with the worker and/or an organization. It should be noted that a worker and/or a manager can provide information indicating a number of hours that the worker has worked according to other techniques, in accordance with embodiments of the present disclosure.

The platform can calculate a fatigue state associated with the worker based on collected work data for the worker. The fatigue state refers to an amount or level of fatigue accumulated by the worker over a time period based on a number of hours worked by the worker over the time period (referred to herein as work hours) and/or a number of hours during which the worker did not work over the time period (referred to herein as rest hours). In some embodiments, the fatigue state can be represented by a number of fatigue hours that can be accumulated by the worker over the time period. In some embodiments, the number of fatigue hours accumulated by a worker can be proportional to or otherwise correspond to a number of hours worked during the time period. The platform can determine the fatigue state of the worker based on a target work calendar associated with the worker, in some embodiments. The target work calendar can indicate a target number of hours to be worked by the worker and/or a target work schedule for the worker that minimizes fatigue experienced by the worker. The target work calendar can be determined in view of the number of hours previously worked by the worker and/or a historical work schedule for the worker (e.g., over the particular time period), in accordance with embodiments described herein.

In some embodiments, the target work calendar for the worker can be associated with a daily fatigue function that is configured to take, as an input, a number of work hours and/or rest hours for the worker over a particular time period (e.g., as indicated by work data provided via a time card for the worker) and provide, as an output, an indication of a number of fatigue hours accumulated by the worker over the particular time period. The daily fatigue function can include a daily fatigue equation, where one or more elements of the daily fatigue equation correspond to work hours and/or rest hours for a worker over a time period. The daily fatigue function can provide the number of fatigue hours accumulated by the worker of the time period by applying the number of work hours and/or rest hours to the elements of the fatigue equation. Further details regarding the daily fatigue function and the daily fatigue equation are described herein. In an illustrative example, the daily fatigue function can take a number of work hours and/or rest hours for the worker indicated by a time card for a particular day and provide, as an output, an indication of a number of fatigue hours accumulated by the worker during the particular day. Fatigue weight coefficients can be applied to one or more elements of the daily fatigue function, and values of the fatigue weight coefficients can be optimized in view of a number of fatigue hours associated with the target work calendar for the worker and/or other target work calendars for other workers at the organization. Further details regarding the daily fatigue function and optimizing the weight coefficients of the daily fatigue function are provided herein.

The platform can calculate the fatigue state associated with the worker based on the number of fatigue hours accumulated during each day of the time period, in some embodiments. For example, for each day of the time period, the platform can provide the number of work hours and/or rest hours as input to the daily fatigue function and determine the number of fatigue hours accumulated during the day. In some embodiments, a day during which the worker submits one or more work hours in a time card corresponds to a positive number of fatigue hours while a day during which the worker does not submit one or more work hours (e.g., a weekend day, a rest day, etc.) in a time card corresponds to a negative number of fatigue hours. The platform can calculate the fatigue state for the worker by aggregating (e.g., taking a summation of) the number of fatigue hours accumulated for each day of the time period. The calculated fatigue state can indicate the total number of fatigue hours accumulated over the time period.

The impact of fatigue on a worker may be more significant for more recent events than for events that occurred in the more distant past. Accordingly, the platform can apply a time weight coefficient to the number of fatigue hours accumulated for one or more days to account for the impact. The value of a time weight coefficient applied to the number of accumulated fatigue hours for a particular day can depend on a distance (e.g., a temporal distance) between the particular day and a current day (e.g., a day during which the fatigue score for a worker is requested). In an illustrative example, the time period can begin at the current date (e.g., day t0) and end 120 days in the past (e.g., day t120). The time weight coefficient applied to the number of fatigue hours accumulated during or around the current date (e.g., days t0-t7) can have a value of one, while the time weight coefficient applied to the number of fatigue hours accumulated during or around days at the end of the time window (e.g., day t120) can have a value near or approaching zero (e.g., 0.05). Values for time weight coefficients applied to the number of fatigue hours accumulated during days between the current date and the end of the time window can be determined according to a monotonically decreasing function (e.g., a Sigmoid function). Further details regarding calculating the fatigue state, determining values for time weight coefficients, and aggregating the number of accumulated fatigue hours are provided herein.

In some embodiments, the platform can determine a fatigue score associated with the worker based on the calculated fatigue state. The platform may determine the fatigue score based on one or more normalization techniques (e.g., linear scaling, etc.) applied to the calculated fatigue state for the worker and the fatigue state calculated for other workers of the organization, in some embodiments. In additional or alternative embodiments, the platform may determine the fatigue score by determining whether the calculated fatigue state satisfies one or more fatigue criteria. For example, the fatigue criteria can include one or more threshold fatigue state values each corresponding to a distinct fatigue score. In response to determining that the calculated fatigue state for a worker meets or exceeds a threshold fatigue state value of the fatigue state criteria, the platform can identify a fatigue score corresponding to the threshold fatigue state value and assign the identified fatigue score as the fatigue score for the worker. In response to determining the fatigue score, the platform can provide the fatigue score to a client device associated with a manager of the worker for presentation via a graphical user interface (GUI) of the client device. In some embodiments, the platform can also provide a recommendation of one or more measures to reduce the fatigue score, for presentation to the manager via the GUI. Further details regarding the recommended measures and providing the fatigue score and recommended measures for presentation via the GUI are provided herein.

Aspects of the present disclosure address the above and other deficiencies by providing techniques for quantifying worker fatigue based on work data associated with a worker and providing a fatigue score representing the quantified worker fatigue to a manager of the worker, in some embodiments, along with recommendations on measures to mitigate the worker fatigue. As indicated above, the fatigue score for a worker can be determined based on data that is collected by a worker management platform for an organization. The fatigue score can be determined based on work data collected for the worker over a particular time period that is aggregated according to techniques that apply a higher weight coefficient to fatigue accumulated in the more recent past than to fatigue accumulated in the more distant past. Accordingly, the fatigue score determined for the worker represents an accurate state of the worker's fatigue level, which enables a manager to take immediate action to mitigate the worker fatigue, as needed. By determining the fatigue state and corresponding fatigue score for workers based on work data collected by the platform, the platform is able to provide organizations with an accurate depiction of fatigue levels for workers without conducting lengthy or resource consuming interviews with individual workers. Accordingly, a significant amount of time and resources (e.g., computing resources) for the organization are conserved and therefore made available for other processes. Organizations are able to take immediate action to mitigate fatigue for workers, if necessary, which can also improve working conditions (e.g., safety conditions, etc.) and overall worker satisfaction at the organization.

FIG. 1 illustrates a high-level component diagram of an example system architecture 100, in accordance with one or more aspects of the present disclosure. The system architecture 100 (also referred to as "system" herein) includes data store 110, server machine 130, server machine 140, worker management platform 150, and/or one or more client devices 170A-N (collectively and individually referred to as client device(s) 170), each connected to a network 102. In some embodiments, network 102 may be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. Data store 110 may be hosted by one or more storage devices, such as main memory, magnetic or optical storage-based disks, tapes or hard drives, NAS, SAN, and so forth. In some implementations, data store 110 may be a network-attached file server, while in other embodiments data store 110 may be some other type of persistent storage such as an object-oriented database, a relational database, and so forth, that may be hosted by platform 150 or one or more different machines coupled to the platform 150 via network 102.

Client device(s) 170 can include computing devices such as a personal computer (PC), a laptop, a mobile phone, a tablet computer, or any other computing device. In some embodiments, client device(s) 170 may also be referred to as "user devices." In some embodiments, client device(s) 170 can be associated with an organization. An organization can refer to any entity including one or more people and having a particular purpose. For example, an organization can include a company, an institution, an association, a government, a charity, a partnership, etc. In some embodiments, an organization can include one or more workers. A worker refers to an individual (or group of individuals) that performs specific tasks on behalf of the organization. For example, a worker can include an employee (e.g., a full time employee, a part time employee, etc.), an independent contractor, an official of the organization (e.g., a director, etc.), a volunteer, and so forth. In some embodiments, a worker of an organization can report to other workers of the organization (referred to as "managers" herein). A manager of an organization can report to other managers of the organization, who can report to other managers, and so on. For purposes of explanation and illustration only, a worker refers to an individual (or group of individuals) of an organization that are supervised one or more other workers (e.g., managers) of the organization. It should be noted that embodiments of the present disclosure can be applied to any type of individual of an organization. In some embodiments, a client device 170 can be associated with a respective worker of an organization. In one example, a first client device 170A can be associated with a worker and a second client device 170B can be associated with a manager of the worker.

Worker management platform 150 (referred to simply as "platform 150" herein) can provide client device(s) 170 with access to one or more applications that enable an organization to manage data associated with the organization. Platform 150 can also collect data associated with one or more workers of the organization and, in some embodiments, can store the collected data at data store 110. As illustrated in FIG. 1, platform 150 can include a worker data engine 132 and/or a worker fatigue engine 142, in some embodiments. Worker data engine 132 can be configured to manage data (e.g., work data) associated with workers of the organization, in accordance with embodiments herein. Worker fatigue engine 142 can be configured to determine a fatigue score indicating a level of worker fatigue associated with workers of the organization, in accordance with embodiments herein. In additional or alternative embodiments, worker fatigue engine 142 can be configured to determine one or more measured that are to be recommended to a manager associated with a worker to mitigate a level of worker fatigue associated with a worker. One or more operations of worker data engine 132 and/or worker fatigue engine 142 can be performed at computing resources associated with platform 150, in some embodiments. In other or similar embodiments, one or more operations of worker data engine 132 can be performed at server machine 130 and one or more operations of worker data engine 132 can be performed at server machine 140. Platform 150 can cause worker data engine 132 and/or worker fatigue engine 142 to perform one or more operations by transmitting instructions to such engines via network 102, in some embodiments.

In some embodiments, worker management platform 150 can provide client device(s) 170 with an application that enables a worker and/or a manager to provide a work schedule associated with the worker. A work schedule refers to specified time intervals (e.g., hours, days, etc.) that the worker is expected to work at the organization during a time period (e.g., a week, a month, etc.). In some embodiments, the work schedule can indicate one or more work shifts during the time period that the worker is expected to work. The work schedule can indicate, in some embodiments, one or more time intervals that the worker is not expected to work. In one example, such time intervals can include one or more rest days, vacation days, etc. The worker and/or a manager can provide an indication of a work schedule for the worker via a graphical user interface (GUI) of a respective client device 170 associated with the worker and/or the manager. The client device 170 can transmit the provided work schedule to platform 150 (e.g., via network 102). A worker data engine 132 of platform 150 can store the work schedule at data store 110 as work data associated with the worker. In additional or alternative embodiments, worker management platform 150 can provide client device(s) 170 with an application that enables a worker to provide a number of hours worked during a particular time period (e.g., a day, a week, etc.). For example, worker management platform 150 can provide client device 170 with an application that enables a worker associated with the client device 170 to submit a number of hours worked (e.g., for a particular day, for a particular week, etc.) via a time card. The worker can provide data of the time card to the application via a GUI of the client device 170. The client device 170 can transmit the data of the time card to platform 150 (e.g., via network 102) and worker data engine 132 of platform 150 can store the data at data store 110 as additional work data for the worker.

It should be noted that platform 150 may obtain information regarding a number of hours worked by a worker according to other techniques. For example, worker data engine 132 of platform 150 may receive an indication of the number of hours worked by a worker from a client device associated with a manager of the worker, as described here. In another example, client device 170 may be (or may be connected to) a punch time device. A worker can provide an indication of a time when the worker is beginning a work shift (e.g., can "punch in") using the punch time device and can later provide an indication of a time when the worker has ended their work shift (e.g., can "punch out") using the punch time device. The punch time device (or a client device 170 connected to the punch time device) can provide an indication of the times the worker began the work shift and ended the work shift to platform 120 via network 102, according to previously described embodiments. Platform 150 may collect and/or determine additional data associated with a worker of an organization, in accordance with embodiments described with respect to FIG. 2.

As indicated above, worker fatigue engine 142 can be configured to determine a fatigue score associated with a worker indicating a level of fatigue in view of work data collected for the worker. In some embodiments, worker fatigue engine 142 can be configured to determine one or more measures that are expected to mitigate a level of fatigue for a worker. Further details regarding determining the fatigue score and measures to mitigate the level of fatigue experienced by a worker are provided with respect to FIGS. 2-6. In some embodiments, worker fatigue engine 142 can provide the fatigue score and/or a recommendation on the measures to mitigate the fatigue experienced by a worker to a client device 170 associated with the worker's manager. The client device (e.g., client device 170B) can provide the fatigue score and/or the recommendation for presentation to the manager via the GUI of client device 170B. Further details regarding providing the fatigue score and/or the recommendation of measures to mitigate fatigue via a GUI are described herein, with respect to FIG. 6.

It should be noted that although FIG. 1 illustrates worker data engine 132 and worker fatigue engine 142 as part of platform 150, in additional or alternative embodiments, worker data engine 132 and/or worker fatigue engine 142 can reside on one or more server machines that are remote from platform 150 (e.g., server machine 130 and/or server machine 140). It should be noted that in some other implementations, the functions of server machines 130, 140, and/or platform 150 can be provided by a fewer number of machines. For example, in some implementations, components and/or modules of any of server machines 130, 140 may be integrated into a single machine, while in other implementations components and/or modules of any of server machines 130, 140 may be integrated into multiple machines. In addition, in some implementations, components and/or modules of any of server machines 130, 140 may be integrated into platform 150.

In general, functions described in implementations as being performed by platform 150 and/or any of server machines 130, 140 can also be performed on the client devices 170A-N in other implementations. In addition, the functionality attributed to a particular component can be performed by different or multiple components operating together. Platform 150 can also be accessed as a service provided to other systems or devices through appropriate application programming interfaces, and thus is not limited to use in websites.

Figure 2:
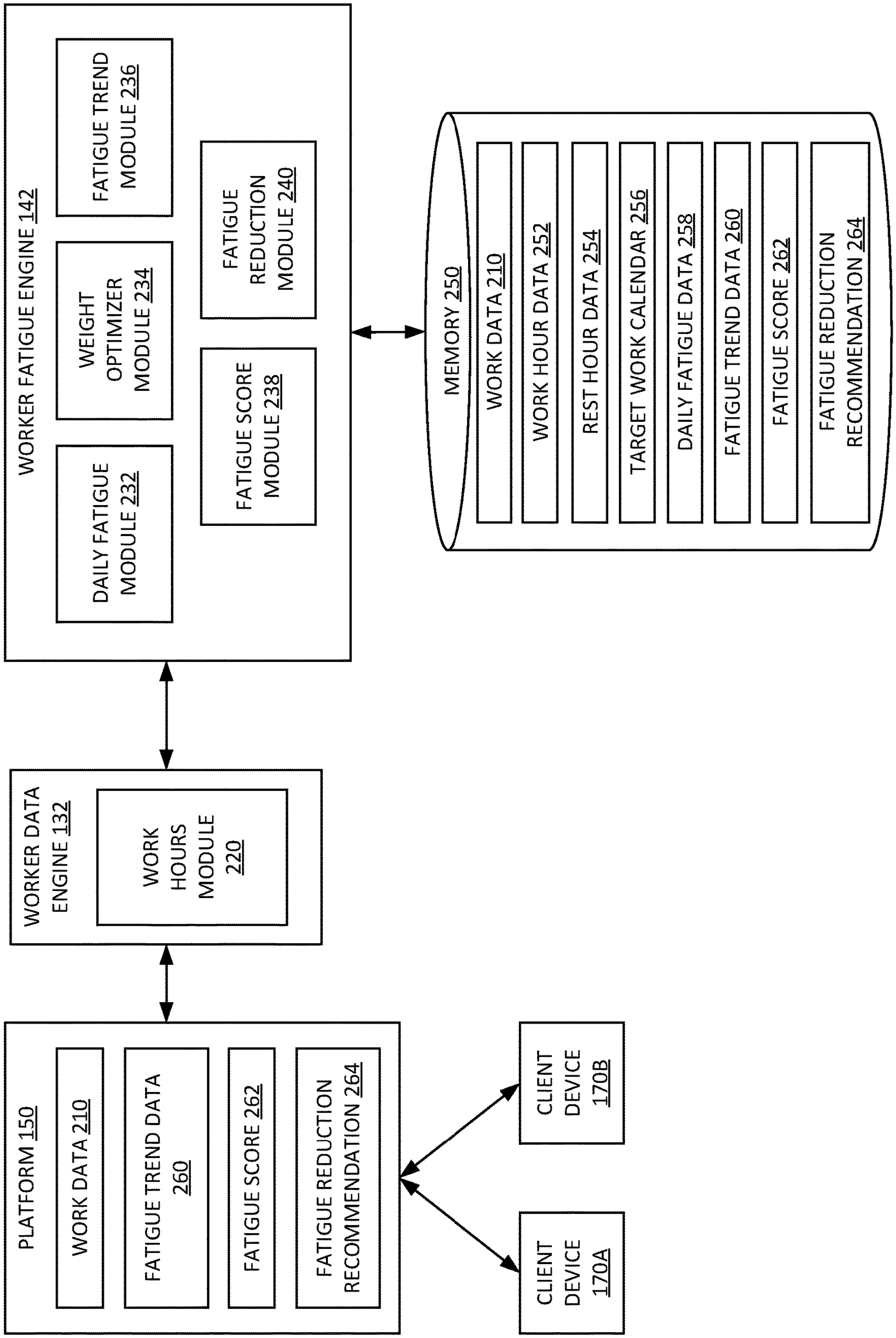
FIG. 2 illustrates an example worker data engine and an example worker fatigue engine, in accordance with one or more embodiments of the present disclosure.

FIG. 2 illustrates an example worker data engine 132 and an example worker fatigue engine 142, in accordance with one or more embodiments of the present disclosure. As described above, worker data engine 132 can be configured to manage data (e.g., work data, etc.) associated with workers of an organization. Worker fatigue engine 142 can be configured to determine a fatigue score indicating a level of worker fatigue associated with workers of an organization and/or recommend measures to mitigate the level of worker fatigue for one or more workers. In some embodiments, worker data engine 132 and/or worker fatigue engine 142 can reside at or be connected to platform 150 (e.g., via network 102), as described with respect to FIG. 1. It should be noted that although the description provides that some operations or functions are performed by worker data engine 132 and others are described as performed by worker fatigue engine 142, any operations or functions performed by worker data engine 132 can be performed by worker fatigue engine 142, and vice versa, in accordance with embodiments of the present disclosure.

Platform 150, worker data engine 132 and/or worker fatigue engine 142 can be connected to memory 250 (e.g., via a bus, via network 102, via another network, etc.). In some embodiments, memory 250 can include one or more portions of data store 110. In other or similar embodiments, memory 250 can include one or more portions of another memory associated with system 100 and/or platform 150.

As indicated above, platform 150 can collect and/or manage data associated with one or more workers of an organization. The data can include work data 210 (e.g., data indicating a work schedule associated with a worker, data indicating a number of hours worked by a worker according to or outside of a work schedule, and so forth) and other types of data, in accordance with embodiments described herein. In some embodiments, work data 210 can be provided to platform 150 by a client device 170 associated with a worker and/or a manager of the worker. For purposes of illustration and explanation only, client device 170A can be associated with a worker of an organization and client device 170B can be associated with a manager of the worker. As indicated above, platform 150 can receive an indication of a work schedule associated with the worker from client device 170A and/or client device 170B, in some embodiments. In additional or alternative embodiments, platform 150 can receive an indication of a number of hours worked by the worker during a time period (e.g., in accordance with the work schedule, outside of the work schedule, etc.) from client device 170A and/or client device 170B, as described above.

As indicated above, a worker and/or manager of an organization can provide other types of data or information associated with a worker to platform 150. For example, a worker can provide an indication, via a GUI of client device 170A, of one or more hours during a scheduled work shift (e.g., indicated by a work schedule) that the worker is unable to work due to illness or injury. Client device 170A can transmit the indication of the hours (referred to herein as sick time) to platform 150 and platform 150 can store the indication at memory 250 as work data 210, as described herein. Worker and/or manager can provide other types of data or information via a GUI of client device 170, such as personal time hours, emergency time off hours, and so forth.

In some embodiments, platform 150 can provide work data 210 (e.g., received from client device 170A and/or client device 170B) to worker data engine 132. Work hours module 220 of worker data engine 132 can be configured to determine work hour data 252 and/or rest hour data 254 based on the provided work data 210. Work hour data 252 can indicate a number of hours worked by the worker (referred to as work hours) during a time period. Rest hour data 254 can indicate a number of hours that the worker did not work during the time period (referred to as rest hours). As provided herein, a work hour refers to an hour, or a portion of an hour, during which a worker performed work for an organization. A rest hour refers to an hour, or a portion of an hour, during which a worker did not perform work for the organization. As indicated above, the provided work data 210 can indicate a number of hours worked by the worker (e.g., as provided via a time card using client device 170A). Work hours module 220 can determine work hour data 252 for a particular time period by extracting the number of hours worked by the worker during the time period from work data 210. In some embodiments, work hours module 220 can determine rest hour data 254 for the worker by subtracting the number of hours worked during the particular time period from a total number of hours of the time period. In an illustrative example, a one week time period can include a total of 168 hours. If a worker works five days of the one week time period and works for eight hours of each of the five days, the total number of work hours for the one week time period is 40 hours and the total number of rest hours for the one week time period is 128 hours.

In some embodiments, work hours module 220 can characterize work hours and/or rest hours of work hour data 252 and/or rest hour data 254, respectively, according to different types of work hours and/or rest hours. The different types of work hours and/or rest hours that can characterize work hours and/rest hours can be provided by a user of platform 150 (e.g., an individual or representative of the organization) and/or by an engineer and/or developer of platform 150. In an illustrative example, work hours module 220 can characterize work hours of work hour data 252 that are between 7:00 am and 5:59 pm as daytime work hours and work hours of work hour data 252 that are between 6:00 pm and 6:59 am as nighttime work hours. Similarly, work hours module 220 can characterize rest hours of rest hour data 254 that are between 7:00 am and 5:59 pm as daytime rest hours and rest hours of rest hour data 254 that are between 6:00 pm and 6:59 am as nighttime rest hours, in another or similar example. In yet another example, work hours module 220 can characterize work hours of work hour data 252 that are on Monday through Friday as weekday work hours and work hours of work hour data 252 that are on Saturday through Sunday as weekend work hours. Similarly work hours module 220 can characterize rest hours of rest hour data 254 that are on Monday through Friday as weekday rest hours and work hours of rest hour data 254 that are on Saturday through Sunday as weekend rest hours. Work hours module 220 can store an indication of the characterization for each work hour of work hour data 252 and each rest hour of rest hour data 254 at memory 250, as described above. In an illustrative example, work hour data 252 for a worker can indicate a number of daytime weekday work hours, nighttime weekday work hours, daytime weekend work hours, and/or nighttime weekend work hours worked by the worker during a particular time period. In yet another illustrative example, rest hour data 254 can indicate a number of daytime weekday rest hours, nighttime weekday rest hours, daytime weekend rest hours, and/or nighttime weekend rest hours for the worker during the particular time period. In some embodiments, the work schedule associated with the worker can indicate that the worker was approved for a day off (e.g., a vacation day) by their manager. Work hours module 220 can characterize rest hours of that day as vacation hours, in accordance with above described embodiments. In additional or alternative embodiments, the work schedule associated with the worker can indicate that the worker did not come into work due to an illness or injury. Work hours module 220 can characterize rest hours of that day as sick hours, in accordance with above described embodiments. Work hours module 220 can characterize work hours and/or rest hours as other types of hours, including holiday hours, hazard hours, and so forth.

In some embodiments, work hours module 220 (and/or a module of worker fatigue engine 142) can determine a target work calendar 256 associated with the worker. A target work calendar 256 can indicate a target number of hours to be worked by the worker and/or a target work schedule for the worker that minimizes fatigue experienced by the worker. In some embodiments, target work calendar 256 can be determined based on a historical number of hours worked by the worker (e.g., during prior time periods) and/or one or more historical work schedules for the worker. In an illustrative example, a manager for the worker can provide (e.g., via client device 170B) a work schedule for the worker to platform 150 for each week over a time period of eight weeks. Each work schedule can indicate that the worker is to work for five days per week (e.g., excluding weekend days) and for eight hours of each of the five days. Each work schedule provided by the manager can be stored at memory 250 as work data 210, as described above. Work hours module 220 can identify a work schedule for the worker during each week of the eight week time period from work data 210 at memory 250 and can determine, based on the identified work schedules, that a target work schedule for the worker is to work five days per week (e.g., excluding weekend days) and for eight hours of each day of the five days. In other words, the target work schedule indicates eight work hours and 16 rest hours per workday of the week and 24 rest hours per weekend day of the week.

In some embodiments, a manager for a worker can provide different work schedules indicating different hours to be worked by the worker for one or more weeks of the particular time period (e.g., the eight week time period). In such embodiments, work hours module 220 can determine the target work calendar 256 associated with the worker by identifying the work schedule that is most frequently provided for the worker by the manager during a particular time period (e.g., the eight week period). In other or similar embodiments, work hours module 220 can determine that two or more calendars were equally provided for the worker during the particular time period. In such embodiments, work hours module 220 can identify the work schedule that is most frequently provided during the time period as the target work calendar 256 associated with the worker.

Once a target work calendar 256 associated with the worker is determined, work hours module 220 (and/or a module of worker fatigue engine 142) can identify a period during which the number of work hours of work hour data 252 exceeded, at least by a predefined threshold, the number of work hours indicated by target work calendar 256. In accordance with the prior illustrative example, the number of work hours indicated by the target work calendar 256 can be approximately 40 work hours per week (e.g., eight work hours for each of the five work days of the work week). Work hours module 220 can determine, based on work hour data 252, that the worker worked approximately 47 hours for a particular work week during the time period. Accordingly, work hours module 220 can determine that the number of work hours worked by the worker exceeds the number of work hours of the target work calendar 256 by approximately 7 hours. Work hours module 220 (and/or a module of worker fatigue engine 142) can provide an indication of the hours that exceed the hours of the target work calendar 256 at memory 250 with work hour data 252.

As illustrated in FIG. 2, worker fatigue engine 142 can include a daily fatigue module 232, a weight optimizer module 232, a fatigue trend module 236, a fatigue score module 238, and/or a fatigue reduction module 240. In some embodiments, daily fatigue module 234 can be configured to determine a level of fatigue acquired by a worker during a particular day during a time period. Daily fatigue module 232 can determine the level of fatigue acquired by the worker during the particular day (referred to herein as daily fatigue) by providing work hour data 252 and/or rest hour data 254 associated with the particular day as input to a daily fatigue function. The daily fatigue function can be configured to take, as an input, a number of hours worked by a worker during a particular day and/or a number of rest hours for the particular day and provide, as an output, a level of fatigue of the worker for the particular day. As indicated above, the level of fatigue can be indicated by a number of fatigue hours accumulated by the worker during the particular day. As indicated above, the number of fatigue hours accumulated by the worker can be a positive value if the worker worked one or more hours of the day, in some embodiments. In other or similar embodiments, the number of fatigue hours accumulated by the worker can be a negative value if the worker did not work one or more hours of the day (e.g., if the day is a weekend day, a vacation day, etc.).

The following fatigue equation is an example equation of the daily fatigue function that can be used to calculate a number of fatigue hours accumulated by the worker for a particular day:

$$\begin{aligned} DailyFatigue = (&TotalWorkingHours + NightWorkingHours * n + \\ &WorkDayRestHours * r + WeekendWorkHours * w) + \\ &(OverNormalHours * o) + (RestDayRestHours * wr) \end{aligned}$$

where "TotalWorkingHours" represents a total number of working hours in a day, "NightWorkingHours" represents a number of night working hours in a work day, "WorkDayRestHours" represents a number of daytime rest hours in a work day, "WeekendWorkHours" represents a number of weekend day work hours, "OverNormalHours" represents a number of over normal hours per work day, and "RestDayRestHours" represents a number of weekday rest hours (e.g., for a weekday without a work shift). As indicated above, the fatigue equation includes several weight coefficients that are applied to different elements of the equation. For example, the equation above includes weight coefficients n, r, w, and wr. The equation above further includes weight coefficient "o," which represents an over normal weight coefficient that is applied to all hours worked over a normal schedule (e.g., the target work schedule) for the worker. As described above, weight optimizer module 234 can optimize the values of weight coefficients n, r, w, wr, and o, in accordance with embodiments described with respect to FIG. 3.

In accordance with embodiments described above, the work hour data 252 can include an indication of a number of workday daytime working hours, a number of nighttime working hours, and/or a number of weekend working hours for the worker. The rest hours data 254 can include an indication of a number of rest hours and/or a number of rest days taken by the worker. As indicated above, daily fatigue module 232 can provide the work hour data 252 and/or the rest hour data 254 as input to the daily fatigue function. In some embodiments, an equation of the daily fatigue function can correspond to the first example equation indicated above. In other or similar embodiments, the equation of the daily fatigue function can correspond to the second example equation indicated above. In some embodiments, a user of platform 150 (e.g., an individual and/or representative of the organization, etc.) can select the first example equation, the second example equation, or another equation for the daily fatigue function (e.g., during a set up period for the organization with applications of the platform 150). Daily fatigue module 232 can obtain a number of fatigue hours accumulated for the day based on one or more of the example equations indicated above.

Figure 3:
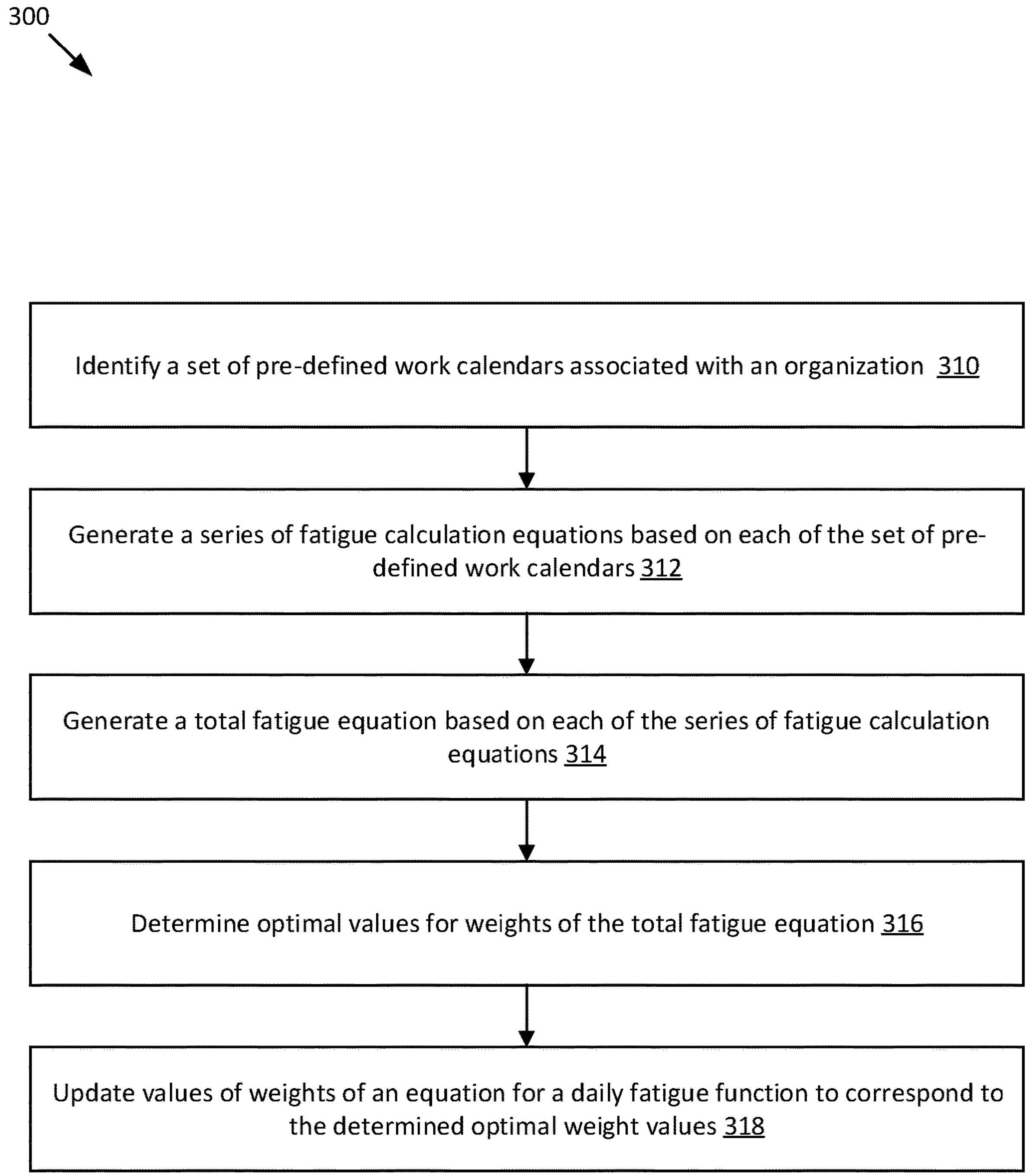
FIG. 3 is a flow diagram illustrating an example method for optimizing weight coefficients for a worker fatigue equation, in accordance with embodiments of the present disclosure.

FIG. 3 is a flow diagram illustrating an example method 300 for optimizing weight coefficients for a worker fatigue equation, in accordance with embodiments of the present disclosure. Method 300 can be performed by processing logic that can include hardware (circuitry, dedicated logic, etc.), software (e.g., instructions run on a processing device), or a combination thereof. In one implementation, some or all of the operations of method 300 can be performed by one or more components of system 100 of FIG. 1. In some embodiments, some or all of the operations of method 300 can be performed by weight optimizer module 234 of worker fatigue engine 142, as described above.

At block 310, processing logic identifies a set of predefined work calendars associated with one or more organizations. In some embodiments, one or more users of platform 150 (e.g., an individual and/or representative of the organization) can provide one or more work calendars associated with the organization via a client device 170. The calendars can indicate one or more work shifts that workers of the organization can work during a particular time period (e.g., a week, a month, etc.). A pre-defined work calendar can include a fixed normal calendar (e.g., indicating a schedule where a worker works one or more shifts for five days per week, eight hours per day following two days off), a rotating normal calendar (e.g., indicating a schedule where a worker works eight hour shifts that are not set for fixed week days), a part-time calendar (e.g., indicating a schedule where a worker works five or less per shifts each with an average duration of between three and seven hours), an incomplete normal calendar (e.g., indicating a schedule where a worker works between seven and 10 hours per shift, but fewer than five shifts per week), a rotating compressed calendar (e.g., indicating a schedule where a worker works shifts lasting approximately 10-12 hours, but the shifts are not fixed to a particular workday of the week), an on-demand calendar (e.g., indicating a schedule where a worker works any number of shifts each with a duration of approximately 3 hours or less), a seasonal/long-rotating calendar (e.g., indicating a schedule where a worker works during particular seasons of the year and/or are dispatched to remote locations from the organization), and/or other types of calendars. In some embodiments, platform 150 can store the indicated work calendars at data store 110 and/or memory 250, as described above. Weight optimizer module 234 can identify the set of pre-defined work calendars at data store 110 and/or memory 250.

At block 312, processing logic generates a series of fatigue calculation equations based on each of the set of pre-defined work calendars. The fatigue calculation equations can include the same or similar elements as one or more of the daily fatigue equations of the daily fatigue function indicated above, but values of each parameter of the equation can correspond to the number of work hours and/or number of rest hours associated with the respective set of pre-defined work calendars. As indicated above, the set of pre-defined work calendars is associated with one or more organizations and can each work calendar can indicate shifts that workers (e.g., multiple different workers) can work during a particular time period. Accordingly, values for parameters of such fatigue calculation equations can correspond to hours worked by workers (e.g., multiple workers) according to one or more respective pre-defined work calendars, rather than hours worked by an individual worker of an organization, in some embodiments.

An example fatigue calculation equation to be used for optimizing the weight coefficients of the daily fatigue equation can reflect the amount of rest acquired for a worker and can include:

$$\text{Fatigue} = \mathit{WorkDaysCount} * (\mathit{DayHours} + \mathit{NightHours} * n + (24 - \mathit{TotalHours}) * r + \mathit{WeekendHours} * w) + \mathit{RestDayCount} * 24 * wr$$

where "WorkDaysCount" represents the number of workdays in the week, "DayHours" represents a number of daytime work hours worked by one or more respective workers associated with a respective pre-defined work calendar, "NightHours" represents a number of nighttime work hours worked by the one or more respective workers, "TotalHours" represents a total number of hours worked by the one or more respective workers, "WeekendHours" represents the total number of weekend hours worked by the one or more respective workers, and "RestDaysCount" represents the total number of rest days taken by the one or more respective workers. One or more parameters of the example fatigue equation can have negative values, in some embodiments. For example, parameters associated with an amount of rest accumulated by workers (e.g., which mitigates accumulated fatigue) can have a negative value. As seen above, the fatigue equation further includes several weight coefficients that are applied to different elements of the equation. For example, of the equation above, "n" represents a night weight coefficient that is applied to all nighttime work hours, "r" represents a rest hours weight coefficient that is applied to all rest hours, "w" represents a weekend weight coefficient that is applied to all weekend work hours, and "wr" is a weekend/day off rest weight coefficient that is applied to all rest hours accumulated during a weekend day or a day off. In some embodiments, the value of the base weight coefficient can be provided by a developer and/or an engineer of platform 150. In some embodiments, the value of the base weight coefficient can be chosen as a value that scales the amount of fatigue caused by each working hours such to accurately reflect an amount of fatigue accumulated by a worker. In an illustrative example, the value of the base weight coefficient can be approximately "1." In other or similar embodiments, a user of platform 150 can provide the value of the base weight coefficient.

In an illustrative example, a fixed normal calendar can indicate a schedule where a worker works one or more shifts five days per week, eight hours per day following two days off (e.g., weekend days). The example first fatigue calculation equation representing the fixed normal calendar can include:

$$5*(8+16*n+(24-8)*r+0*w)+2*24*wr$$

Weight optimizer module 234 can generate the series of equations for each pre-defined calendar of the set of pre-defined calendars (e.g., including the example equations for the fixed normal calendar indicated above) based on the example fatigue calculation equation and/or another fatigue calculation equation. It should be noted that the example equations provided in the present description are not intended to be limiting. Any equation that includes the same or similar parameters as the example equations of the present description can be used, in accordance with embodiments of the present disclosure.

At block 314, processing logic generates a total fatigue equation based on each of the series of fatigue calculation equations. The total fatigue equation can represent a total amount of fatigue that could be accumulated for each pre-defined calendar. An example of the total fatigue equation can include:

$$\mathit{TotalFatigue} = \mathrm{SUM}\left(\mathit{CalendarWeight} * \mathit{CalendarFatigue} * \left(\frac{30}{\mathit{WorkDaysCount} + \mathit{RestDaysCount}}\right)\right)$$

where, for each element of the summation, "CalendarWeight" represents a percentage of workers at the organization that are associated with a particular calendar type, "CalendarFatigue" represents the first fatigue calculation equation and/or the second fatigue calculation equation indicated above for the particular calendar type, "WorkDaysCount" represents a total number of work days in a month for the particular calendar type, and "RestDaysCount" represents a total number of rest days for the particular calendar type. In some embodiments, weight optimizer module 234 can determine the share of workers of the organization that are associated with each calendar type based on work data 210 associated with each worker of the organization. For example, for each worker of the organization, weight optimizer module 234 can determine a work calendar that best represents a work schedule associated with the worker (e.g., as indicated by work data 210) and can determine the total number of workers associated with the work calendar. Weight optimizer module 234 can determine the share of workers associated with the work calendar type based on the total number of workers associated with the work calendar and the total number of workers at the organization.

At block 316, processing logic determines optimal values for weight coefficients of the total fatigue equation. As indicated above, the weight coefficients of the total fatigue equation are included for each "CalendarFatigue" equation included for each element of the summation. In some embodiments, processing logic (e.g., weight optimizer module 234) can determine the optimal values for each daily fatigue function invoked by the total fatigue equation by applying linear programming techniques (e.g., the simplex method) to minimize the total amount of fatigue accumulated for each calendar of the total fatigue equation. In an illustrative example, a constraint used for such linear programming techniques can include that a ratio between the aggregated weekly fatigue for any two calendars is not to exceed a value of four. In another illustrative example, another constraint used for such linear programming techniques can include that a value of the weekend work weight coefficient (e.g., "w") is not to have a value of less than 0.2. Such constraints can be determined and/or correspond to observational data for calendars that are commonly associated with employees (e.g., of a particular organization, across one or more organizations, etc.). It should be noted that other types of optimization techniques can be used to determine the optimal values for weight coefficients of the total fatigue equation, in accordance with embodiments of the present disclosure.

At block 318, processing logic can update values of the weight coefficients of an equation for a daily fatigue function to correspond to the determined optimal weight coefficient values. In some embodiments, weight optimizer module 234 can update the weight coefficient values of the first example daily fatigue equation and/or the second example described with respect to FIG. 2 to correspond to the optimal weight coefficient values determined with respect to block 316.

Referring back to FIG. 2, daily fatigue module 232 can determine the level of fatigue accumulated for each day of a time period by providing work hour data 252 and/or rest hour data 254 as input to the daily fatigue function, as described above. Daily fatigue module 232 can store the determined level of fatigue for each day of the time period as daily fatigue data 258 at memory 250, in some embodiments.

Fatigue trend module 236 can be configured to determine a fatigue trend associated with the worker over the time period based on the daily fatigue data 258 determined for each day of the time period. A fatigue trend can represent an amount of fatigue accumulated by the worker over a particular time period. In some embodiments, the particular time period can correspond to a time period during which the worker worked and/or rested for multiple time intervals. For example, the time period can correspond to a time period of eight weeks or longer, where the worker worked and/or rested for each week of the time period. Such time period used to determine the fatigue trend is referred to as the trend time period herein. It should be noted that the trend time period can be longer, shorter, or the same length as a time period corresponding to a work schedule for a worker, in some embodiments. In some embodiments, the length of the trend time period can be provided by an engineer and/or developer of platform 120. The length of the trend time period can be chosen as a time period for which a threshold amount of work data 210 is collected for a worker of the organization such that an accurate fatigue state can be calculated for the worker, in accordance with embodiments described herein. In other or similar embodiments, a user of platform 120 can provide an indication of the length of the trend time period (e.g., via client device 170), as described above.

In some embodiments, the fatigue trend can represent an aggregation of fatigue accumulated by the worker during each time interval (e.g., day) of the trend time period. As indicated above, events of the recent past are to have a larger impact on the fatigue of a worker than events of the distance past. Accordingly, fatigue trend module 236 can determine values for time weight coefficients to the daily fatigue data 258 for each time interval of the trend time period, where each time weight coefficient corresponds to a distance between a current time interval (e.g., a time interval during which a user of platform 150 is requesting to access fatigue data associated with a worker) and a time interval associated with respective daily fatigue data 258.

Figure 4:
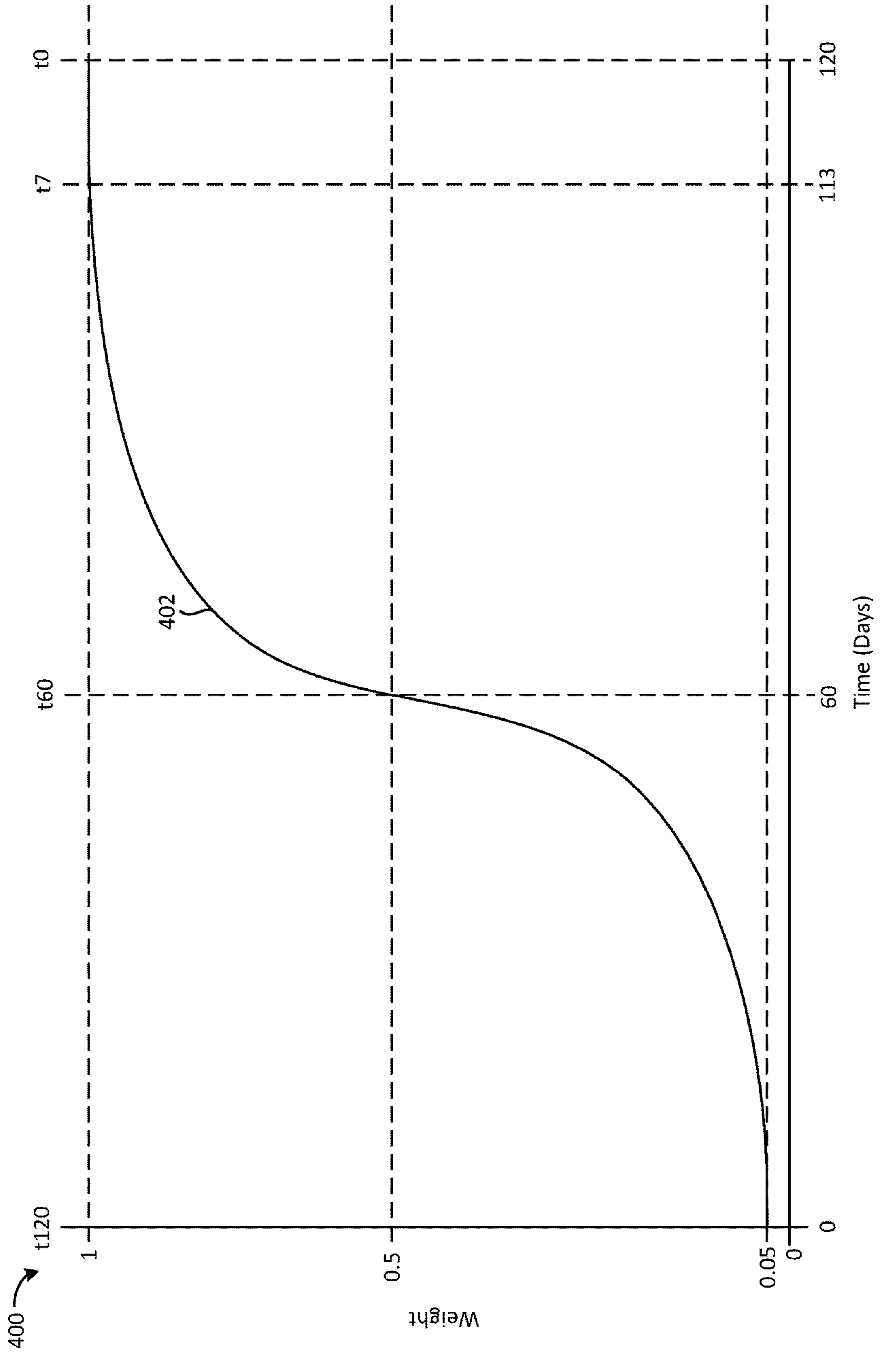
FIG. 4 depicts an example convolution window for determining a fatigue score for a worker of an organization, in accordance with embodiments of the present disclosure.

FIG. 4 depicts an example convolution window 400 for determining a fatigue trend for a worker of an organization, in accordance with embodiments of the present disclosure. Convolution window 400 can include a convolution curve 402, which indicates a degradation of the impact of fatigue accumulated on time intervals in the distant past compared to fatigue accumulated on time intervals in the more recent past. Data of convolution window 400 can be provided by an engineer and/or developer of platform 150, in some embodiments. As illustrated in FIG. 4, a right region of convolution window 400 indicates a time interval (e.g., a day) that is at or closest to a current time interval of the trend time period and a left region of convolution window 400 indicates the time interval that is farthest from the current time interval. For purposes of example and illustration only, the time period being considered to evaluate a worker's fatigue can be approximately 120 days. Accordingly, the time interval at the beginning of the time period can be time t0 (e.g., day 0), which is closest to the current time interval of the time period. The time interval at the end of the time period can be time t120 (e.g., day 120), which is farthest from the current time interval of the time period.

The convolution curve 402 of convolution window 400 can indicate a weight factor to be applied to daily fatigue data 258 determined for a worker for each time interval (e.g., day) of the time period. For example, convolution curve 402 indicates that a value of the weight factor to be applied to daily fatigue data 258 for a time interval at or around time t0 of the time period has a value of approximately "1" while a value of the weight factor to be applied to daily fatigue data 258 for a time interval at or around time t120 has a value at or approaching "0" (e.g., approximately 0.05). Fatigue trend module 236 can determine a weight factor to be applied to daily fatigue data 258 for a particular time interval by determining which weight factor value corresponds to the particular time interval, as indicated by convolution curve 402. For example, fatigue trend module 236 can determine that a weight factor value of "0.5" is to be applied to daily fatigue data 258 for a time interval at or around time t60 based on convolution curve 402. In an illustrative example, fatigue trend module 236 can determine the weight factor to be applied to daily fatigue data 258 by providing an indication of a particular time interval of the trend time period as input to a function (e.g., a Sigmoid function) and obtaining an indication of the weight factor value as an output of the function. The function can determine the time weight factor value based on convolution curve 402, as described above.

It should be noted that although the convolution curve 402 has a shape of a sigmoid function, convolution curve 402 can have other shapes, in accordance with embodiments described herein. In an illustrative example, convolution curve 402 can have any shape so long as one or more of the following constraints are satisfied: the curve is within a discrete space with the same granularity as the daily fatigue function (e.g., days), it is defined only for a positive weight factor value, the value of each weight factor is within a range of 0.0 and 1.0, the shape provides a flat or semi-flat line at or around an initial time period of the convolution window (e.g., at or around time period t0), the value of the weight factor monotonically decreases along the convolution window, and/or the size of the convolution value is finite.

Referring back to FIG. 2, fatigue trend module 236 can determine a weight factor value that is to be applied to daily fatigue data 258 for each time interval of the trend time period based on convolution curve 402 of convolution window 400 and can apply the determined weight factor values to the daily fatigue data 258 to determine the fatigue trend for the worker. In some embodiments, fatigue trend module 236 can apply the weight factor value to the daily fatigue data 258 by multiplying the daily fatigue data 258 for each time interval of the trend time period and aggregating (e.g., summing) each multiplied daily fatigue data value to determine an aggregated fatigue data value. The aggregated fatigue data value can indicate the fatigue trend for the worker. Fatigue trend module 236 can store the determined fatigue trend as fatigue trend data 260 at memory 250.

FIG. 5 depicts example work data and fatigue data associated with a worker of an organization, in accordance with embodiments of the present disclosure. Example work data and fatigue data of FIG. 5 is depicted in the form of a data structure 500 (e.g., a table). In some embodiments, data of data structure 500 can be stored at data store 110 and/or memory 250, in accordance with embodiments described above. It should be noted that the work data and fatigue data can be stored or otherwise maintained using other types of data structures and/or according to other data maintenance mechanisms. It should also be noted that the work data and fatigue data of FIG. 5 may not be managed and/or organized according to any such structure at data store 110 and/or memory 250, in some embodiments. Data structure 500 is illustrated with respect to FIG. 5 for purposes of explanation and illustration of the embodiments of this disclosure.

As illustrated in FIG. 5, data structure 500 can include one or more entries that each include work data and/or fatigue data for a worker during a particular day of a time period. It should be noted that although entries of data structure 500 indicate data for a particular day of the time period, entries of data structure 500 can indicate data for any time interval of the trend time period (e.g., a particular hour, etc.). Each entry of data structure 500 can include a time interval field 502, a rest time field 504, a total time worked field 506, a daytime worked field 508, a night time worked field 510, a daily fatigue field 512, a fatigue trend field 514, a fatigue score field 516 and/or a recommended vacation days field 518. The time interval field 502 of a respective entry can indicate a time interval of the trend time period. The rest time field 504 can indicate whether the hours of the time interval are hours of a rest time (e.g., a weekend day, a vacation day, etc.). The total time worked field 506 can indicate a total amount of time worked by the worker during the time interval, the daytime worked field 508 indicating the amount of time worked by the worker during the daytime and the nighttime worked field 510 indicating the amount of time worked by the worker during the nighttime. For purposes of example an illustration only, a current interval of the trend time period is described as Mar. 15, 2021. In some embodiments, worker fatigue engine 142 may have previously calculated the daily fatigue data 258, fatigue trend data 260, fatigue score 262, and so forth for each prior time interval of the trend time period, in accordance with embodiments described herein. It should be noted that, in some embodiments, each entry can include additional fields. For example, the entries can include a weekend day field, which indicates whether a particular time interval corresponds to a weekend day (e.g., Saturday, Sunday, etc.). In another example, the entries can include a field indicating a number of weekend hours worked for each time interval.

Values of the day fatigue field 512 indicate the level of fatigue accumulated by the worker during the particular time interval. The values of the day fatigue field 512 for a respective entry of data structure 500 can correspond to daily fatigue data 258 be determined by daily fatigue module 232 for each time interval of the trend time period, in accordance with previously described embodiments. As illustrated in FIG. 5, Mar. 7, 2021 is characterized as a "rest day" for the worker and the total time worked on Mar. 7, 2021 is "0" hours. Accordingly, the amount of fatigue accumulated by the worker on Mar. 7, 2021 is a negative value (e.g., "−10" fatigue hours." As also illustrated in FIG. 5, Mar. 8, 2021 is not characterized as a "rest day" for the worker and the total time worked on Mar. 8, 2021 is "7.9" hours (e.g., each of which were worked during the daytime). The amount of fatigue accumulated by the worker on Mar. 8, 2021 is a positive value (e.g., "4.15" hours).

As described above, fatigue trend module 236 can determine a weight factor value that is to be applied to daily fatigue data 258 for each time interval of the time period and can apply the weight factor to daily fatigue data 258 to determine the fatigue trend for the worker for a particular time interval. In accordance with the example of FIG. 5, daily fatigue module 232 can determine the level of fatigue accumulated for each day between and including Mar. 7, 2021 and Mar. 15, 2021. In one example, the current time interval (e.g., the current day at which a manager is requesting to access fatigue data associated with the worker) is Mar. 15, 2021. In accordance with embodiments and examples described with respect to FIG. 2 and FIG. 4, fatigue trend module 236 can determine that a weight factor having a value of "1" is to be applied to the daily fatigue accumulated on each of time intervals Mar. 13, 2021 through Mar. 15, 2021. Fatigue trend module 236 can determine that the weight factor having a value of "0.9" is to be applied to the daily fatigue accumulated on time interval Mar. 12, 2021, in some embodiments. The weight factor value determined for application to the level of fatigue accumulated on Mar. 7, 2021 can be lower than the other weight factor values determined for the fatigue accumulated on other days.

In an illustrative example, fatigue trend module 236 can multiply the daily fatigue for each interval (e.g., indicated by day fatigue field 512) by a weight factor value determined for the daily fatigue and aggregate (e.g., sum) the multiplied daily fatigue values to determine the fatigue trend for the current interval (e.g., Mar. 15, 2021). As illustrated in FIG. 5, the calculated fatigue trend for Mar. 15, 2021 shows that the fatigue state of the worker is approximately 40.67 fatigue hours. The fatigue state for the worker on Mar. 15, 2021 has increased from the fatigue state for the worker on Mar. 7, 2021.

Referring back to FIG. 2, fatigue score module 238 can determine a fatigue score 262 that represents the worker's current fatigue state in view of fatigue trend data 260. In some embodiments, a user of platform 150 and/or an engineer and/or developer of platform 150 can provide a particular fatigue score range that can indicate a fatigue level of any worker of the organization. For purposes of example and illustration only, the fatigue score 262 for workers of the organization can fall between 0.0 and 10.0, where a fatigue score of 0.0 indicates that the worker is not experiencing any fatigue and a fatigue score of 10.0 indicates that the worker is experiencing an extreme amount of fatigue. It should be noted that other ranges of fatigue scores 262 can be used, in accordance with embodiments of the present disclosure. In some embodiments, a range of the fatigue score 262 can correspond to a shape and/or size of convolution curve 402 of convolution window 400.

In some embodiments, fatigue score module 238 can determine the fatigue score 262 for a particular worker based on fatigue trend data 260 for a current time interval of the trend time period and fatigue trend data 260 determined for one or more other workers of the organization for the current time interval. In some embodiments, the one or more other workers can include workers associated with the same team or group as the particular worker. In other or similar embodiments, the one or more other workers can include workers working at the same facility or location as the particular worker. In yet other or similar embodiments, the one or more other workers can include each additional worker of the organization. Fatigue score module 238 can identify fatigue tend data 260 for the particular worker and fatigue trend data 260 for the other workers at memory 250. In some embodiments, fatigue score module 238 can provide the identified fatigue trend data 260 for each worker as input to a normalization function. The normalization function can be configured to normalize the fatigue trend data 260 for each worker of the organization over the trend time period and provide, as an output, an indication of a fatigue score for a particular worker. Fatigue score module 238 can determine a fatigue score 238 for the particular worker based on one or more outputs of the normalization function.

In additional or alternative embodiments, fatigue score module 238 can determine a fatigue score 262 for a particular worker based on one or more fatigue score criteria defined by a user of platform 150 and/or a developer and/or engineer of platform 150. In an illustrative example, the fatigue score criteria can include one or more fatigue trend threshold values that are each associated with a respective fatigue score (e.g., defined by a user, developer and/or engineer of platform 150). Fatigue score module 238 can determine that the fatigue trend data 260 determined for the particular worker meets or exceeds a fatigue trend threshold value of the fatigue score criteria. Responsive to determining that the fatigue trend data 260 meets or exceeds the fatigue trend threshold value, fatigue score module 238 can identify the respective fatigue score corresponding to the fatigue trend threshold value and can assign the identified fatigue score as the fatigue score 262 for the particular worker at the current interval.

Referring back to FIG. 5, as described above, entries of data structure 500 can each include a fatigue score field 516. The fatigue score field 516 can indicate a fatigue score 262 calculated for the worker for a particular time interval of the trend time period, as described above. In accordance with at least one prior illustrative example, the fatigue score calculated for the worker on Mar. 15, 2021 can be approximately "7.45." In some embodiments, worker fatigue engine 142 can provide an indication of the fatigue trend data 260 and/or fatigue scores 262 calculated for one or more intervals of the trend time period for presentation to a user (e.g., a manager) of platform 150. Further details regarding presentation of the fatigue trend data 260 and/or the fatigue scores 262 are provided with respect to FIG. 6 below.

Referring back to FIG. 2, in some embodiments, worker fatigue engine 142 can include a fatigue reduction module 240. Fatigue reduction model 240 can be configured to determine one or more measures that may reduce or mitigate an amount of fatigue accumulated by a particular worker. In some embodiments, the one or more measured determined by fatigue reduction module 240 can include a number of rest days that, if taken by the worker, are expected to reduce the fatigue accumulated by the worker. In some embodiments, fatigue reduction module 240 can determine the number of rest days based on the number of fatigue hours accumulated during prior rest days for the worker. For example, as illustrated in FIG. 5, Mar. 7, 2021 is indicated as a rest time (e.g., a rest day) for a worker. During the rest day, the worker accumulated "−10" hours of fatigue. Fatigue reduction module 240 can also determine that Mar. 13, 2021 and Mar. 14, 2021 are also indicated as rest days for the worker and during each day, the worker accumulated "−10" hours of fatigue. Accordingly, fatigue reduction module 240 can determine that for each rest day taken by the worker, the worker is expected to reduce the amount of accumulated fatigue by approximately "10" hours. On Mar. 15, 2021, the fatigue trend data 260 determined for the worker can indicate that the amount of fatigue accumulated is approximately "40.67" fatigue hours. In view of the above, fatigue reduction module 240 can determine that the worker should take four rest days to reduce the amount of fatigue for the worker to zero, or approximately zero. As illustrated in FIG. 5, the recommended rest days field 518 of the entry for time interval Mar. 15, 2021 indicates that the worker is recommended to take four rest days to reduce the fatigue accumulated by the worker.

In some embodiments, one or more applications provided by platform 150 to client device(s) 170 can enable a worker to provide a rest day request (e.g., a vacation day request) to their manager. A rest day request refers to a request for the manager to allow a worker to not report to work during one or more work hours indicated by a work schedule associated with the worker. In an illustrative example, a worker can initiate a rest day request by providing data associated with the request to client device 170A via interaction with a GUI of client device 170A. The client device 170A can transmit the provided data of the request to worker data engine 132 of platform 150. Work hours module 220 can store the data of the request at data store 110 and/or memory 250 (e.g., as rest request data, etc.) and/or can transmit a notification of the request to client device 170B associated with the worker's manager. The manager can provide an indication of whether the request is approved or denied by interacting with a GUI of client device 170B. Client device 170B can transmit an indication of the approval or the denial to worker data engine 132 and work hours module 220 can store the indication of the approval or the denial at data store 110 and/or memory 250, in some embodiments. In other or similar embodiments, work hours module 220 can transmit the indication to client device 170A for presentation to the worker via the GUI of client device 170A. Platform 150 can facilitate other types of requests, in accordance with embodiments and examples provided above. For example, platform 150 can facilitate requests by the worker to change a work schedule associated with the worker, swap shifts with another worker of the organization, and so forth.

As described above, fatigue reduction module 240 can determine a number of rest days that are expected to reduce an amount of fatigue accumulated by a worker. In some embodiments, fatigue reduction module 240 can determine that the worker has provided a rest day request to their manager, in accordance with embodiments described above. Fatigue reduction module 240 can accordingly generate a recommendation for the manager to approve the rest day request in view of the determined number of rest days that are expected to reduce the amount of fatigue. Such recommendation can be stored at memory 250 as fatigue reduction recommendation 264. In an illustrative example, the rest day request provided by the worker can indicate more rest days than determined by fatigue reduction module 240 to reduce fatigue accumulated by the worker. In some embodiments, the fatigue reduction recommendation 264 can indicate that the manager is recommended to approve the request for the determined number of rest days to reduce fatigue and deny the request for any additional rest days. In other or similar embodiments, the fatigue reduction recommendation 264 can indicate that the manager is recommended to approve the request for each indicated rest day. In another illustrative example, the rest day request provided by the worker can indicate fewer rest days than determined by fatigue reduction module 240 to reduce fatigue accumulated by the worker. In some embodiments, the fatigue reduction recommendation 264 can indicate that the manager is recommended to approve the request for the specified number of rest days and to allow the worker to take additional rest days in accordance with the number of recommended rest days determined by fatigue reduction module 240.

In other or similar embodiments, fatigue reduction module 240 can generate a recommendation to approve or deny a request to change the work schedule associated with the worker, swap shifts with another worker, etc. based on the fatigue trend data 260 and/or a fatigue score 262 calculated for the worker. In an illustrative example, a user of platform 150 and/or an engineer and/or developer of platform 150 can provide one or more rules associated with fatigue reduction measures to be recommended based on fatigue scores 262 determined for workers. One or more of the provided rules can indicate that if a fatigue score 262 determined for a worker meets or exceeds a threshold fatigue score (e.g., a score of 7.0), that fatigue reduction module 240 is to generate a fatigue reduction recommendation 264 for the manager to approve a request to change a work schedule associated with the worker. Fatigue reduction module 240 can generate the fatigue reduction recommendation 264 in accordance with the provided one or more rules.

Figure 6:
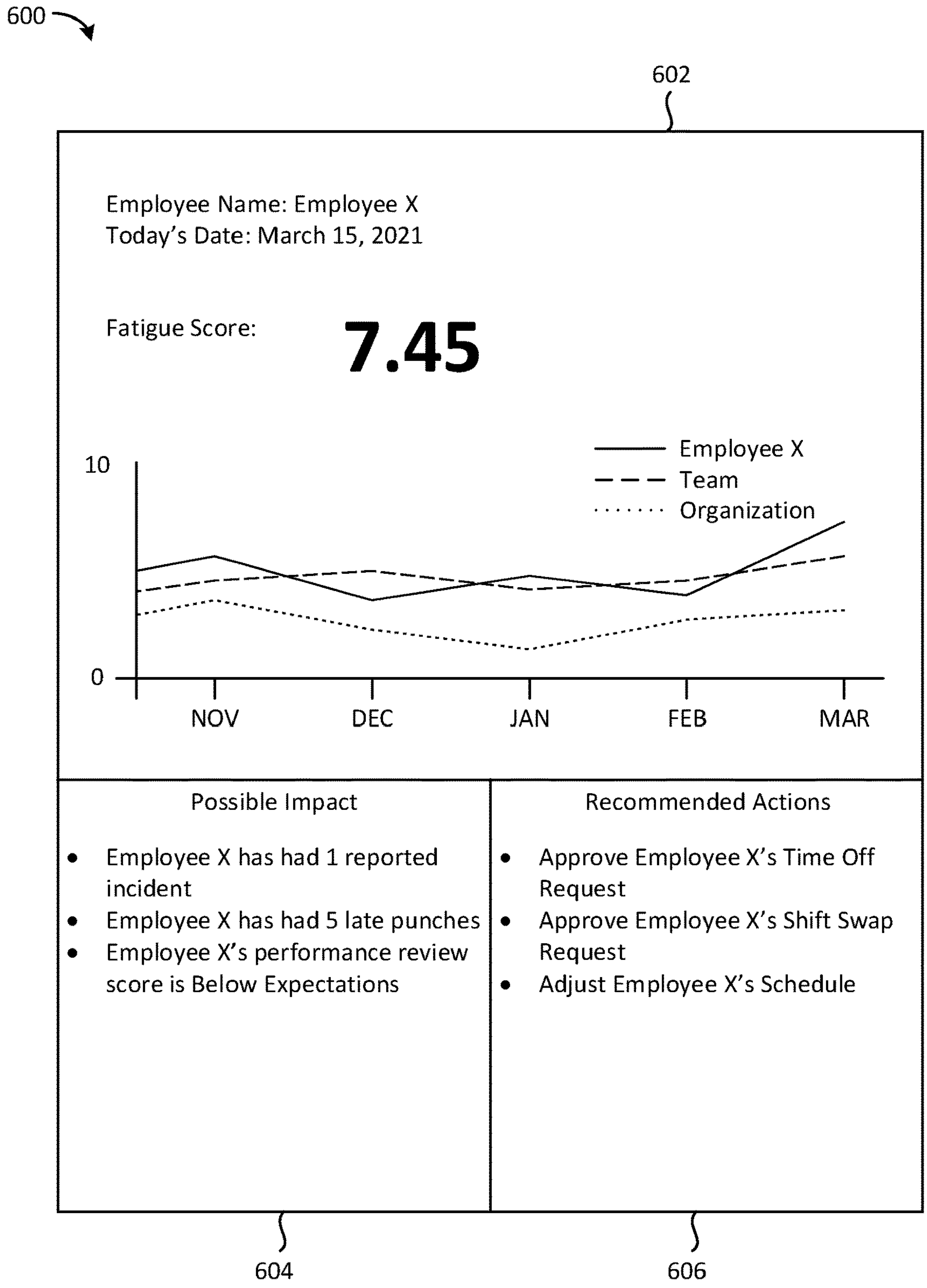
FIG. 6 depicts an example graphical user interface (GUI), in accordance with embodiments of the present disclosure.

FIG. 6 depicts an example graphical user interface (GUI) 600, in accordance with embodiments of the present disclosure. In some embodiments, example GUI 600 can be presented via a client device (e.g., client device 170B) associated with a manager of a worker for an organization. In some embodiments, example GUI 600 can include a first region 602, a second region 604 and/or a third region 606. First region 602 of example GUI 600 can include one or more elements that include data associated with the worker and/or other workers of the organization. In an illustrative example, first region 602 can include a name associated with a worker of the organization (e.g., "Employee X"), a current time interval during which the manager is accessing GUI 600 (e.g., "Mar. 15, 2021") and/or a fatigue score 262 determined for the worker, in accordance with previously described embodiments. In some embodiments, first region 602 can additionally or alternatively include one or more elements that provide fatigue trend data 260 for the worker over a particular time period (e.g., a trend time period) and/or fatigue trend data 260 calculated for other workers of the organization. As illustrated in FIG. 6, first region 602 of GUI 600 can include a line graph including lines that depict a fatigue score 262 calculated for the worker (e.g., "Employee X"), workers on the same team as Employee X, and workers throughout the organization for each month of a time period (e.g., a trend time period). Such data can indicate to a manager for the worker whether the amount of fatigue accumulated by Employee X is the same as or similar to the amount of fatigue accumulated by other workers on the team and/or at the organization. In some embodiments, the data associated with the other workers on the same team and/or at the organization can be obtained based on fatigue trend data 260 and/or fatigue scores 262 calculated for the other workers, in accordance with previously described embodiments.

Second region 604 of example GUI 600 can indicate a possible impact that fatigue is having on the worker, in some embodiments. As illustrated in FIG. 6, the possible impact can indicate a number of reported incidents for the worker (e.g., during the trend time period), a number of late punches (e.g., starting a shift later than a schedule time) for the worker (e.g., during the trend time period), and/or a performance review associated with the worker. In some embodiments, such data indicated by second region 604 can be stored and/or maintained at data store 110 and/or memory 250. Worker fatigue engine 142 can identify such data collected during the trend time period from data store 110 and/or memory 250 and can provide the identified data for presentation to the user (e.g., manager) via GUI 600, in some embodiments. It should be noted that data of second region 604 as illustrated in FIG. 6 is provided for illustration and example only. Other types of data can be provided for presentation via region 604 of example GUI 600, in accordance with previously described embodiments.

Third region 606 of example GUI 600 can indicate one or more recommended actions that the manager of worker can take to try to mitigate the amount of fatigue accumulated by the worker. The one or more recommended actions can be actions of measures indicated by fatigue reduction recommendation 264, as described above. As illustrated in FIG. 6, a recommended action can include a recommendation to approve Employee X's time off (e.g., rest day) request, approve Employee X's shift swap request, and/or adjust Employee X's schedule (e.g., in accordance with a schedule adjustment request). It should be noted that other types of recommendations can be included in region 606 of GUI 600, in accordance with embodiments of the present disclosure.

In additional or alternative embodiments, GUI 600 can provide one or more elements that enable a user (e.g., manager) to provide feedback to platform 150 regarding the calculated fatigue score and/or the recommended actions. For example, GUI 600 can include one or more elements (not shown) that enable the manager to provide an indication of whether the fatigue score calculated for the worker is accurate and/or whether the recommended actions reduced the fatigue accumulated by the worker. Client device 170B can transmit the provided indication to platform 150 (e.g., via network 102), in some embodiments. In some embodiments, platform 150 can use the provided indications to generate training data to train a machine learning model to predict a future fatigue score that is to be associated with a worker (e.g., in view of prior fatigue trend data collected for the worker) and/or one or more recommendations that are likely to prevent the worker from accumulating fatigue that matches the predicted future fatigue score. In an illustrative example, platform 150 can generate training data including a set of training inputs that each indicate current fatigue trend data determined for a worker of the organization, a fatigue score calculated based on the current fatigue trend data, and/or one or more measures taken to try to mitigate the accumulated fatigue indicated by the current fatigue trend data. The training data can also include a target output for each of the set of training inputs that indicates whether the calculated fatigue score accurately reflects the amount of fatigue of the worker and/or whether the one or more measures taken to try to mitigate the accumulated fatigue were successful. Platform 150 can provide the training data to train the machine learning model (e.g., a neural network, etc.) to predict a future fatigue score to be associated with a worker and/or one or more recommendations that are likely to prevent the worker from accumulating fatigue based on given fatigue trend data for the worker. It should be noted that the training inputs and/or the target outputs for training the model can include additional or alternative data associated with the worker, in some embodiments. For example, the training inputs and/or the target outputs can include data collected by one or more biometric devices associated with the worker, observational data collected for the worker, data indicating a type of organization and/or work environment associated with the worker (e.g., whether the worker works in a high risk environment, etc.), a season during which the worker works for the organization, worker experience and/or tenure with the organization, how the worker is compensated by the organization, and so forth.

Figure 7:
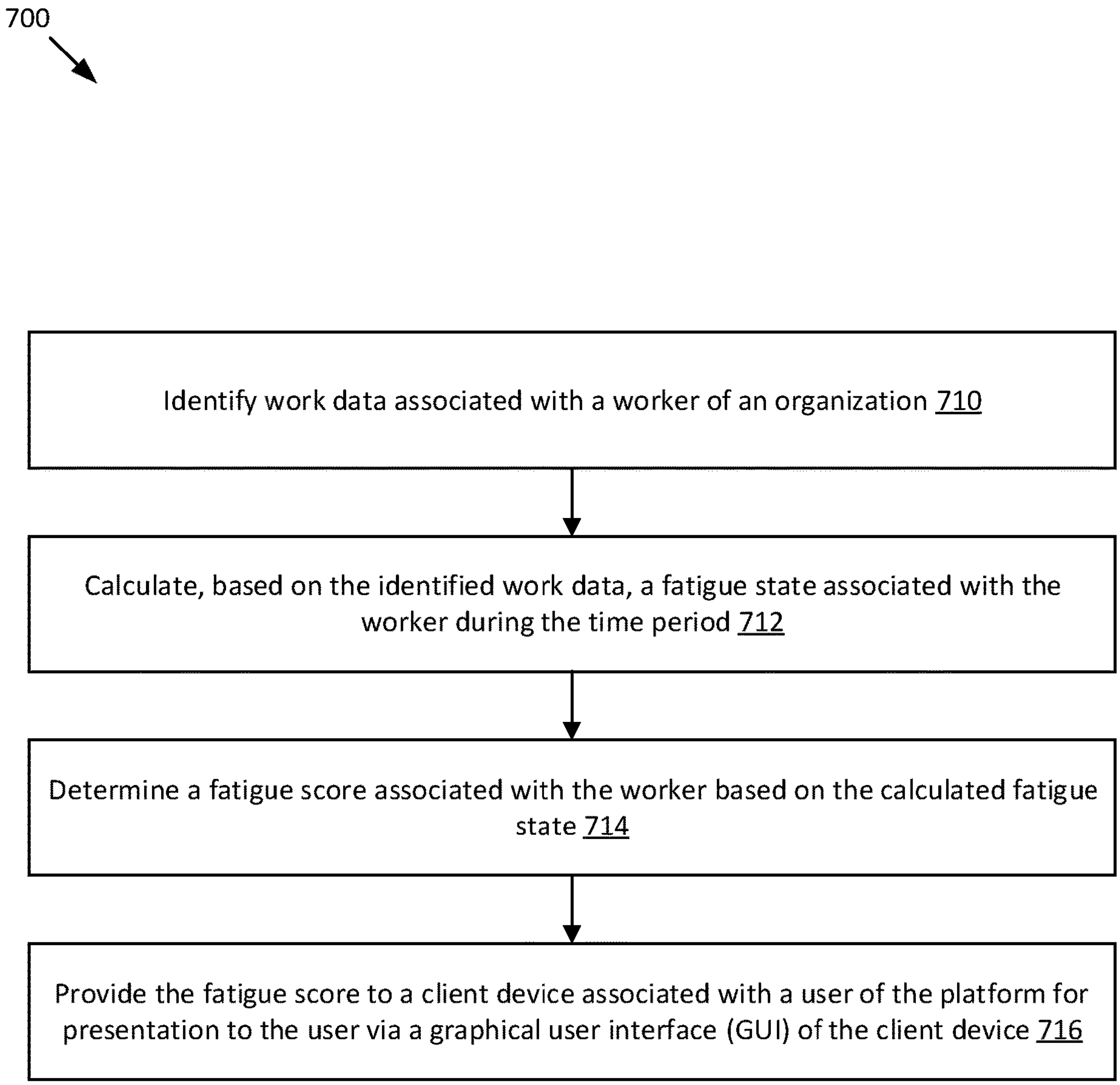
FIG. 7 is a flow diagram illustrating an example method for determining a fatigue score for a worker of an organization, in accordance with embodiments of the present disclosure.

FIG. 7 is a flow diagram illustrating an example method 700 for determining a fatigue score for a worker of an organization, in accordance with embodiments of the present disclosure. Method 700 can be performed by processing logic that can include hardware (circuitry, dedicated logic, etc.), software (e.g., instructions run on a processing device), or a combination thereof. In one implementation, some or all of the operations of method 700 can be performed by one or more components of system 100 of FIG. 1. In some embodiments, some or all of the operations of method 700 can be performed by one or more modules of worker fatigue engine 142, as described above.

At block 710, processing logic identifies work data associated with a worker of an organization. The work data can indicate a number of hours worked by the worker during one or more intervals of a time period. In some embodiments, processing logic can determine rest data (e.g., a number of rest hours) for the one or more intervals of the time period, in accordance with embodiments described herein. At block 712, processing logic calculates, based on the identified work data, a fatigue state associated with the worker during the time period. As described above, the fatigue state can indicate a current level of fatigue accumulated by the worker and can correspond to fatigue trend data 260.

In some embodiments, processing logic can calculate the fatigue state associated with the worker by determining a level of fatigue associated with the worker during each time interval (e.g., day) of the time period and aggregating (e.g., summing) the determined levels of fatigue to generate an aggregated level of fatigue over the time period. The calculated fatigue state can correspond to the aggregated level of fatigue. Processing logic can determine the level of fatigue during each interval of the time period by providing a number of hours worked during each interval of the time period and/or a number of rest hours during the time period as input to a work fatigue function. The work fatigue function can take a number of hours worked during a time interval (and/or a number of rest hours during the time interval) and provide an indication of an amount of fatigue accumulated during the time interval as an output. An equation of the work fatigue function can include one or more elements where a fatigue weight coefficient is applied to at least one of the one or more elements. The fatigue weight coefficient corresponds to an amount of fatigue accumulated during one or more hours of a respective time interval and is optimized based on a target work schedule associated with the worker (e.g., in accordance with embodiments described with respect to FIG. 3). Processing logic can obtain one or more outputs of the work fatigue function, which indicate the level of fatigue associated with the worker during each interval of the time period.

In some embodiments, processing logic can aggregate the determined levels of fatigue to generate the aggregated level of fatigue over the time period by calculating the summation of each determined level of fatigue associated with the worker during each interval of the time period. Processing logic can further apply a time weight coefficient to each determined level of fatigue associated with the worker. The time weight coefficient can correspond to an amount of time that has passed from a respective time interval associated with a determined level of fatigue and a current time interval of the time period. Processing logic can determine the time weight coefficients in accordance with embodiments described with respect to FIG. 4.

At block 714, processing logic determines a fatigue score associated with the worker based on the calculated fatigue state. The fatigue score can indicate a level of fatigue associated with the worker in view of fatigue of other workers of the organization. Processing logic can determine the fatigue score by providing the calculated fatigue state associated with the worker and a fatigue state associated with one or more workers of the organization as input to a normalization function. Processing logic can obtain one or more outputs of the normalization function, which indicate the fatigue score. In additional or alternative embodiments, processing logic can determine the fatigue score by determining whether the calculated fatigue state exceeds a fatigue state threshold value of a set of fatigue state threshold values. Each of the set of fatigue state threshold values can correspond to a respective fatigue score. In response to determining that the calculated fatigue state exceeds the fatigue state threshold value, processing logic can identify the fatigue state that corresponds to the fatigue state threshold value.

At block 716, processing logic provides the fatigue score to a client device associated with a user of the platform for presentation to the user via a graphical user interface (GUI) (e.g., example GUI 600) of the client device. In some embodiments, one or more recommended measures to reduce the fatigue score are provided with the fatigue score for presentation to the user via the GUI.

It should be noted that the fatigue score for a worker can be determined according to other or additional techniques, in some embodiments. In an illustrative example, a machine learning model can be trained to predict a current level of fatigue associated with a particular worker of an organization based on given work data, work hour data, rest hour data, etc. associated with the worker. The machine learning model can be trained based on a training data set that includes a set of training inputs and a set of target outputs. The set of training inputs can include historical data including historical work data, historical work hour data, historical rest hour data, etc. associated with a worker of an organization. The set of target outputs can include data that indicates a level of fatigue accumulated by the worker associated with the historical data. In some embodiments, the set of target outputs can additionally or alternatively include data indicating one or more measures taken by the worker to mitigate the level of fatigue accumulated by the worker (e.g., to a minimal level of fatigue). Current work data associated with a worker can be provided as input to the trained machine learning model (e.g., by worker fatigue engine 142 or another engine or component of system 100). Worker fatigue engine 142 can obtain one or more outputs of the machine learning model and can determine a current level of fatigue associated with the worker based on the one or more outputs. In some embodiments, worker fatigue engine 142 can determine one or more measures expected to mitigate the level of fatigue experienced by the worker based on the one or more outputs. The determined level of fatigue can be indicated as a fatigue score, such as fatigue score 262, as described herein. Worker fatigue engine 142 can provide an indication of the fatigue score and/or the recommended measures to mitigate the fatigue via GUI 600, in accordance with embodiments described herein.

Figure 8:
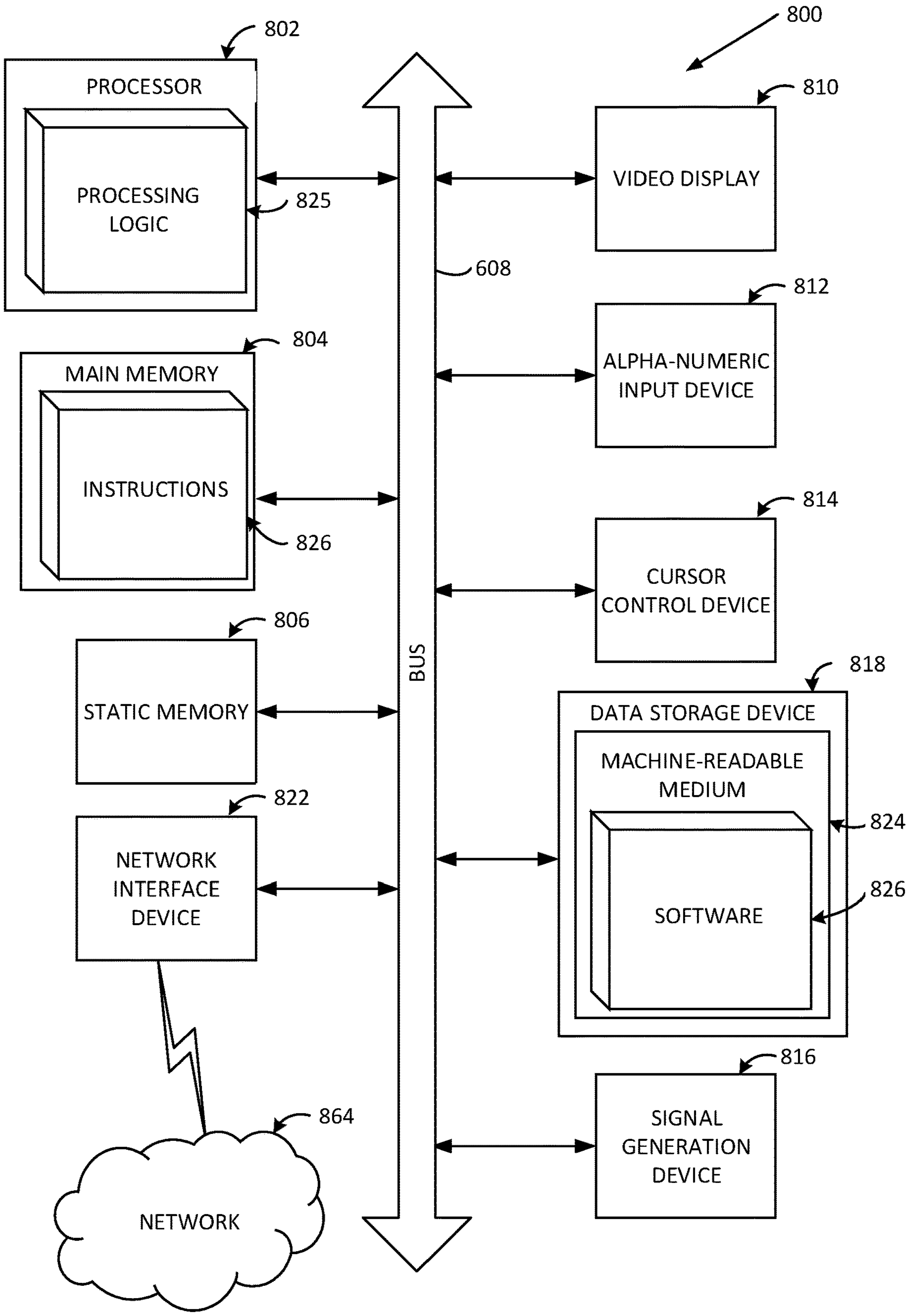
FIG. 8 is a block diagram illustrating a computing system in which implementations of the disclosure can be used.

FIG. 8 is a block diagram illustrating a computer system in which implementations of the disclosure can be used. In some implementations, the computer system 800 can support maintaining passwords for network-accessible service accounts, in accordance with previously described embodiments.

In certain implementations, computer system 800 can be connected (e.g., via a network, such as a Local Area Network (LAN), an intranet, an extranet, or the Internet) to other computer systems. Computer system 800 can operate in the capacity of a server or a client computer in a client-server environment, or as a peer computer in a peer-to-peer or distributed network environment. Computer system 800 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is to execute the instructions 826 for performing the operations and steps discussed herein.

The computer system 800 can further include a network interface device 822 communicably coupled to a network 825. The computer system 800 also can include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

Instructions 826 can reside, completely or partially, within volatile memory 804 and/or within processing device 802 during execution thereof by computer system 800, hence, volatile memory 804 and processing device 802 can also constitute machine-readable storage medium 824. Data storage device 816 can include a computer-readable storage medium 824 (e.g., a non-transitory computer-readable storage medium) on which can store instructions 826 encoding any one or more of the methods or functions described herein, including instructions for implementing method 300 of FIG. 3 and method 700 of FIG. 7.

The non-transitory machine-readable storage medium 824 can also be used to store instructions 826 to support caching results of certain commands utilized for maintaining passwords for network-accessible service accounts described herein, and/or a software library containing methods that call the above applications. While the machine-accessible storage medium 824 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding, or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and does not have an ordinal meaning according to their numerical designation.

Examples described herein also relate to an apparatus for performing the methods described herein. This apparatus can be specially constructed for performing the methods described herein, or it can comprise a general-purpose computer system selectively programmed by a computer program stored in the computer system. Such a computer program can be stored in a computer-readable tangible storage medium.

The methods and illustrative examples described herein are not inherently related to any particular computer or other apparatus. Various general-purpose systems can be used in accordance with the teachings described herein, or it can prove convenient to construct more specialized apparatus to perform methods 300 and 700 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:

identifying, by a processing device, work data associated with a worker of an organization, wherein the work data comprises a number of hours worked by the worker during one or more intervals of a prior time period;

calculating, by the processing device and based on the identified work data, a fatigue state associated with the worker for the prior time period, wherein the fatigue state represents a number of fatigue hours accumulated by the worker over each of one or more intervals of the prior time period relative to a number of work hours associated with the worker and a number of rest hours associated with the worker and based on a target work calendar associated with the worker, wherein calculating the fatigue state comprises:

applying a time weight coefficient to the number of fatigue hours accumulated for each interval of the prior time period, wherein a value of the time weight coefficient for a particular interval depends on a temporal distance between the particular interval and a current interval, and wherein values for the time weight coefficients are determined according to a monotonically decreasing function such that the time weight coefficient applied to fatigue hours accumulated during or around the current interval has a higher value than the time weight coefficient applied to fatigue hours accumulated during intervals at an end of the prior time period;

determining, by the processing device, a fatigue score associated with the worker based on the calculated fatigue state associated with the worker, wherein the fatigue score indicates a level of fatigue associated with the worker during a current time period in view of the calculated fatigue state associated with the worker;

performing one or more normalization operations to obtain a normalized fatigue score associated with the worker based on the determined fatigue score associated with the worker and the fatigue state of other workers of the organization during the prior time period; and providing, by the processing device, the normalized fatigue score to a client device.

2. The method of claim 1, wherein calculating the fatigue state associated with the worker during the prior time period comprises:

determining a level of fatigue associated with the worker during each time interval of the prior time period, wherein the level of fatigue for a respective time interval reflects the number of fatigue hours accumulated by the worker relative to the number of work hours associated with the worker during each prior time interval of the prior time period and the number of rest hours associated with the worker during each prior time interval of the prior time period; and aggregating the determined levels of fatigue to generate an aggregated level of fatigue over the prior time period, wherein the calculated fatigue state corresponds to the aggregated level of fatigue in view of the target work calendar associated with the worker.

3. The method of claim 2, wherein determining the level of fatigue associated with the worker during each interval of the prior time period comprises:

applying a work fatigue function to the number of work hours during each interval of the prior time period and the number of rest hours during each interval of the prior time period.

4. The method of claim 3, wherein an equation of the work fatigue function comprises one or more elements and wherein a fatigue weight coefficient is applied to at least one of the one or more elements, wherein the fatigue weight coefficient corresponds to an amount of fatigue accumulated during one or more hours of a respective time interval, and wherein the fatigue weight coefficient is optimized based on a target work schedule associated with the worker.

5. The method of claim 4, wherein a first element of the one or more elements reflects a total number of working hours in a day, a second element of the one or more elements reflects a number of night working hours in a work day, a third element of the one or more elements reflects a number of daytime rest hours in the work day, a fourth element of the one or more elements reflects a number of weekend day work hours during the prior time period, a fifth element of the one or more elements reflects a number of over normal hours per work day, and a sixth element of the one or more elements reflects a number of weekday rest hours, and wherein the fatigue weight coefficient is applied to one or more of the second element, the third element, the fourth element, the fifth element, or the sixth element.

6. The method of claim 2, wherein aggregating the determined levels of fatigue to generate the aggregated level of fatigue over the prior time period comprises:

calculating a summation of each determined level of fatigue associated with the worker during each interval of the prior time period.

7. The method of claim 1, wherein determining the fatigue score associated with the worker based on the calculated fatigue state comprises:

determining whether the calculated fatigue state exceeds a fatigue state threshold value of a plurality of fatigue state threshold values, wherein each of the plurality of fatigue state threshold values corresponds to a respective fatigue score; and responsive to determining that the calculated fatigue state exceeds the fatigue state threshold value, identifying the respective fatigue score corresponding to the fatigue state threshold value.

8. The method of claim 1, further comprising:

providing, to the client device, one or more recommended measures to reduce at least one of the fatigue score or the normalized fatigue score; and performing one or more operations corresponding to at least one of the one or more recommended measures based on a user selection of the at least one of the one or more recommended measures via a user interface of the client device.

9. The method of claim 8, wherein the one or more recommended measures to reduce the at least one of the fatigue score or the normalized fatigue score comprise an indication of a number of rest hours to mitigate an amount of fatigue accumulated by the worker, and wherein the one or more operations comprise:

identifying schedule data associated with the worker;

determining, based on the identified schedule data, an updated schedule for the worker based on the indicated number of rest hours; and updating the identified schedule data correspond to the updated schedule.

10. The method of claim 1, wherein performing the one or more normalization operations comprises:

providing, as an input to the one or more normalization operations, the determined fatigue score associated with the worker and fatigue trend data associated with one or more of the other workers of the organization, wherein the fatigue trend data indicates the fatigue state of the one or more of the other workers during the time period; and obtaining an output of the one or more normalization operations.

11. The method of claim 1, wherein the one or more normalization operations comprise a linear scaling operation.

12. The method of claim 1, wherein the monotonically decreasing function is a Sigmoid function.

13. The method of claim 1, wherein the values for the time weight coefficients are determined based on a convolution window including a convolution curve, wherein the convolution curve indicates a weight factor value to be applied to the number of fatigue hours accumulated for each interval of the prior time period.

14. A system comprising:

a memory; and a processing device coupled to the memory, the processing device to perform operations comprising:

identifying work data associated with a worker of an organization, wherein the work data comprises a number of hours worked by the worker during one or more intervals of a prior time period;

calculating, based on the identified work data, a fatigue state associated with the worker for the prior time period, wherein the fatigue state represents a number of fatigue hours accumulated by the worker over each of one or more intervals of the prior time period relative to a number of work hours associated with the worker and a number of rest hours associated with the worker and based on a target work calendar associated with the worker, wherein calculating the fatigue state comprises:

applying a time weight coefficient to the number of fatigue hours accumulated for each interval of the prior time period, wherein a value of the time weight coefficient for a particular interval depends on a temporal distance between the particular interval and a current interval, and wherein values for the time weight coefficients are determined according to a monotonically decreasing function such that the time weight coefficient applied to fatigue hours accumulated during or around the current interval has a higher value than the time weight coefficient applied to fatigue hours accumulated during intervals at an end of the prior time period;

determining a fatigue score associated with the worker based on the calculated fatigue state associated with the worker, wherein the fatigue score indicates a level of fatigue associated with the worker during a current time period in view of the calculated fatigue state associated with the worker;

performing one or more normalization operations to obtain a normalized fatigue score associated with the worker based on the determined fatigue score associated with the worker and the fatigue state of other workers of the organization during the prior time period; and providing the normalized fatigue score to a client device.

15. The system of claim 14, wherein calculating the fatigue state associated with the worker during the prior time period comprises:

determining a level of fatigue associated with the worker during each time interval of the prior time period, wherein the level of fatigue for a respective time interval reflects the number of fatigue hours accumulated by the worker relative to the number of work hours associated with the worker during each prior time interval of the prior time period and the number of rest hours associated with the worker during each prior time interval of the prior time period; and aggregating the determined levels of fatigue to generate an aggregated level of fatigue over the prior time period, wherein the calculated fatigue state corresponds to the aggregated level of fatigue in view of the target work calendar associated with the worker.

16. The system of claim 15, wherein determining the level of fatigue associated with the worker during each interval of the prior time period comprises:

applying a work fatigue function to the number of work hours during each interval of the prior time period and the number of rest hours during each interval of the prior time period.

17. The system of claim 16, wherein an equation of the work fatigue function comprises one or more elements and wherein a fatigue weight coefficient is applied to at least one of the one or more elements, wherein the fatigue weight coefficient corresponds to an amount of fatigue accumulated during one or more hours of a respective time interval, and wherein the fatigue weight coefficient is optimized based on a target work schedule associated with the worker.

18. The system of claim 15, wherein aggregating the determined levels of fatigue to generate the aggregated level of fatigue over the prior time period comprises:

calculating a summation of each determined level of fatigue associated with the worker during each interval of the prior time period.

19. The system of claim 14, wherein determining the fatigue score associated with the worker based on the calculated fatigue state comprises:

determining whether the calculated fatigue state exceeds a fatigue state threshold value of a plurality of fatigue state threshold values, wherein each of the plurality of fatigue state threshold values corresponds to a respective fatigue score; and responsive to determining that the calculated fatigue state exceeds the fatigue state threshold value, identifying the fatigue score corresponding to the fatigue state threshold value.

20. A non-transitory computer readable storage medium including instructions that, when executed by a processing device, cause the processing device to perform operations comprising:

identifying work data associated with a worker of an organization, wherein the work data indicates at least a number of hours worked by the worker during one or more intervals of a prior time period;

calculating, based on the identified work data, a fatigue state associated with the worker for the prior time period, wherein the fatigue state represents a number of fatigue hours accumulated by the worker over each of one or more intervals of the prior time period relative to a number of work hours associated with the worker and a number of rest hours associated with the worker and based on a target work calendar associated with the worker, wherein calculating the fatigue state comprises:

applying a time weight coefficient to the number of fatigue hours accumulated for each interval of the prior time period, wherein a value of the time weight coefficient for a particular interval depends on a temporal distance between the particular interval and a current interval, and wherein values for the time weight coefficients are determined according to a monotonically decreasing function such that the time weight coefficient applied to fatigue hours accumulated during or around the current interval has a higher value than the time weight coefficient applied to fatigue hours accumulated during intervals at an end of the prior time period;

determining a fatigue score associated with the worker based on the calculated fatigue state associated with the worker, wherein the fatigue score indicates a level of fatigue associated with the worker during a current time period in view of the calculated fatigue state associated with the worker;

performing one or more normalization operations to obtain a normalized fatigue score associated with the worker based on the determined fatigue score associated with the worker and the fatigue state of other workers of the organization during the prior time period; and providing the normalized fatigue score to a client device.

* * * * *